United States Patent [19]

Talati et al.

[11] Patent Number: 4,961,133

[45] Date of Patent: Oct. 2, 1990

[54] METHOD FOR PROVIDING A VIRTUAL EXECUTION ENVIRONMENT ON A TARGET COMPUTER USING A VIRTUAL SOFTWARE MACHINE

[75] Inventors: Kiritkumar Talati, Sunnyvale; C. Willard Lackie, Richardson, both of Tex.

[73] Assignee: VISystems, Inc., Dallas, Tex.

[21] Appl. No.: 391,691

[22] Filed: Aug. 10, 1989

Related U.S. Application Data

[63] Continuation of Ser. No. 118,307, Nov. 6, 1987, abandoned.

[51] Int. Cl.$^5$ .................... G06F 15/20; G06F 9/44
[52] U.S. Cl. .................... 364/200; 364/280.4; 364/281.3; 364/230.3; 364/232.1; 364/261
[58] Field of Search ... 364/200 MS File, 900 MS File, 364/300, 419, 513

[56] References Cited

U.S. PATENT DOCUMENTS

| | | | |
|---|---|---|---|
| 3,614,745 | 10/1971 | Podvin | 364/200 |
| 4,567,574 | 1/1986 | Saade | 364/300 |
| 4,586,158 | 4/1986 | Brandle | 364/900 |
| 4,636,948 | 1/1987 | Gdaniec et al. | 364/300 |
| 4,667,290 | 5/1987 | Goss et al. | 364/300 |
| 4,672,532 | 6/1987 | JongeVos | 364/200 |
| 4,692,896 | 9/1987 | Sakoda et al. | 364/900 |
| 4,704,678 | 11/1987 | May | 364/300 |
| 4,720,779 | 1/1988 | Reynard et al. | 364/200 |
| 4,734,854 | 3/1988 | Afshar | 364/200 |
| 4,751,740 | 6/1988 | Wright | 364/900 |
| 4,763,242 | 8/1988 | Lee et al. | 364/200 |
| 4,791,558 | 12/1988 | Chaitin et al. | 364/200 |
| 4,862,351 | 8/1989 | Green et al. | 364/200 |

FOREIGN PATENT DOCUMENTS 0209693  1/1987  European Pat. Off. .

*Primary Examiner*—Thomas C. Lee
*Attorney, Agent, or Firm*—David H. Judson

[57] ABSTRACT

A system and method for providing application program portability and consistency across a number of different hardware, database, transaction processing and operating system environments. In the preferred embodiment, the system includes a plurality of processes for performing one or more tasks required by the application software in one or more distributed processors of a heterogenous or "target" computer. In a runtime mode, program code of the application software is pre-processed, compiled and linked with system interface modules to create code executable by a operating system of the target computer. The executable code, which includes a number of functional calls to the processes, is run by the operating system to enable the processes to perform the tasks required by the application software. Communications to and from the processes are routed by a blackboard switch logic through a partitioned storage area or "blackboard".

4 Claims, 3 Drawing Sheets

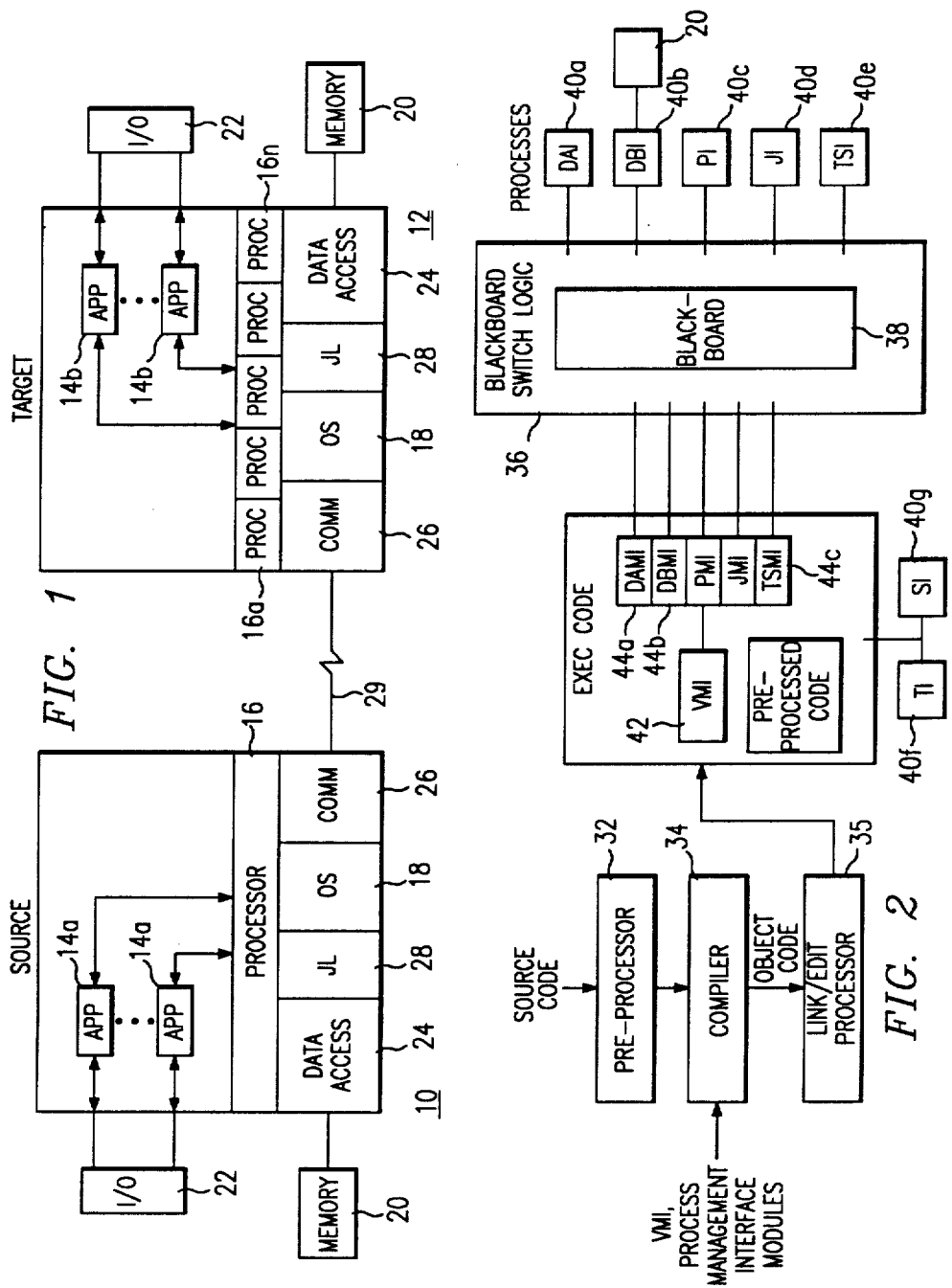

METHOD FOR PROVIDING A VIRTUAL EXECUTION ENVIRONMENT ON A TARGET COMPUTER USING A VIRTUAL SOFTWARE MACHINE

This application is a continuation of application Ser. No. 07/118,307, filed Nov. 6, 1987, now abandoned.

TECHNICAL FIELD

The present invention relates generally to computer systems and more particularly to a virtual interface architecture for porting application software, normally compatible with a "source" computer, to a heterogenous or "target" computer.

BACKGROUND OF THE INVENTION

Computer systems having homogenous hardware can interact and share data over a network. For example, a "local area network" can connect two or more computers located in physical proximity to enable users to access a shared database. Moreover, it has also been possible in the prior art to exchange software between identical types of machines. To the contrary, most interactions between heterogenous machines still involve little more than simple transfers of data files or the like. Software applications written for one type of hardware or for one specific type of operating environment, however, cannot be ported or "transferred" to a system having different physical characteristics without being entirely rewritten. Therefore, while much progress has been made in developing techniques for exchanging data between incompatible machines, it has not been possible to exchange software between heterogenous computer systems.

There have been a number of solutions proposed to overcome the "compatibility" problems associated with the enormous array of prior art computer systems having diverse and incompatible hardware and/or software. One solution is the use of a single operating system along a continuum of hardware products from microframe to mainframe. Although this approach is a satisfactory solution with respect to the products of an individual manufacturer, it does not allow the transfer of software applications across incompatible hardware and operating system environments. Another alternative would be the creation of a common communication environment across distributed systems through use of a standard industry-wide protocol. While some efforts have been made to generate standards for such a protocol, this solution presents complex technological problems.

There therefore exists a need for an interface system which provides application program portability and consistency across diverse computer environments.

BRIEF SUMMARY OF THE INVENTION

It is an object of the present invention to provide an architecture for porting application software, normally compatible with a "source" computer, to a heterogenous or "target" computer.

It is still another object to create a "virtual" interface architecture which enables heterogenous machines to mask the differences in their hardware and software by isolating the application software from the processing environment.

It is another object of the invention to provide application program portability and consistency across a number of different office automation, transaction processing and non-procedural language-based system architectures.

It is yet a further object of the present invention to enable an existing application program to function as a direct link to the hardware and operating system of a diverse computer system without a transaction processing system.

It is another object of the present invention to provide a method and apparatus which facilitates the functional interconnection of programs written in procedural programming languages (such as "C", "COBOL" or "ADA"), or the interconnection of a program written in a procedural programming language with a program written in a non-procedural programming language (such as "LISP" or "PROLOG").

It is a further object of the present invention to allow the development of application programs on micro or mini-computers for migration to mainframe computers and vice versa. As a byproduct, the present invention allows existing mainframe transaction processing system applications to run on micro or mini-computers without modifications or programming changes.

It is still another object to provide a virtual interface system which will enable the migration of existing applications to new and more advanced hardware environments created in the future.

According to the preferred embodiment of the invention, a virtual interface system for porting application software to a heterogenous or "target" computer comprises a plurality of independent interface processes for running in one or more distributed processors of the target computer. One or more of the processes are used to carry out at least one task required by the application software. The system also includes a pre-processor and compiler for processing program code of the application software into object code compatible with the target computer. According to the preferred embodiment, the program code of the application software is pre-processed by identifying functional calls therein, converting the functional calls in the program code to functional calls in the language native to the target computer, and compiling the functional calls of the language native to the target computer to create the object code. The pre-processor is implemented in either the source computer or the target computer.

The object code corresponding to the pre-processed program code is then linked with control codes of the virtual interface system to generate code fully executable by the operating system of the target computer. The system control codes include a plurality of so-called process management interface modules for communicating with the plurality of processes via a partitioned storage area, and a virtual management interface for controlling the plurality of process management interface modules. The virtual management interface and the process management interface modules are compiled into object code before linkage with the object code corresponding to the pre-processed program code.

According to a feature of the invention, the virtual interface system further includes a blackboard switch logic for generating the partitioned storage area and for interfacing the plurality of processes to the process management interface modules via the partitioned storage area. All communications to and from the processes go through the blackboard switch logic to the partitioned storage area and vice versa.

In a run-time mode, the executable code (comprising the linked pre-processed program code the virtual management interface and the process management interface modules) is run using the operating system of the target computer. This operation enables the process management interface modules to control the processes via the blackboard switch logic and the partitioned storage area and thereby enable the processes to carry out the task required by the application software.

In accordance with another feature of the invention, the target computer includes a plurality of partitioned storage areas, each generated and controlled by its own blackboard switch logic. Each of the partitioned storage areas may also include its own plurality of independent processes. In this architecture, processes associated with one partitioned storage area communicate with processes associated with another partitioned storage area via the blackboard switches. In addition to routing data and control information between the process management interface modules and the processes via the partitioned storage areas, each blackboard's switch logic includes security and encryption/decryption algorithms to prevent or limit access to the one or more storage areas.

BRIEF DESCRIPTION OF THE DRAWINGS

For a more complete understanding of the present invention and the advantages thereof, reference is now made to the following Description taken in conjunction with the accompanying Drawings in which:

FIG. 1 is a block diagram of a source computer and a heterogenous or "target" computer;

FIG. 2 is a simplified block diagram of a virtual interface system of the present invention for providing application program portability and consistency across the source and target computers of FIG. 1;

DETAILED DESCRIPTION

Figures 3, 5:
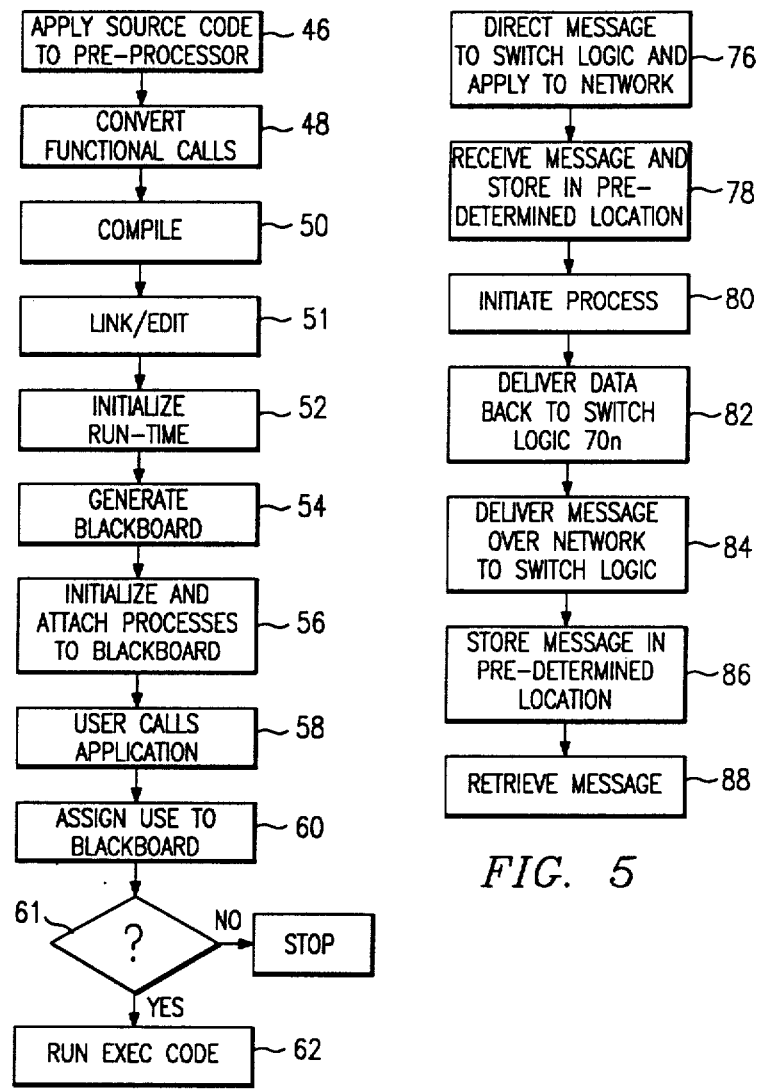
FIG. 3 is a simplified flowchart showing the basic operating steps of the virtual interface system of FIG. 2.
FIG. 5 is a flowchart representation describing how the virtual interface system of FIG. 4 effects retrieval of data from a remote database of the target computer.

With reference now to the drawings wherein like reference characters designate like or similar parts throughout the several figures, FIG. 1 is a simplified block diagram of a "source" computer 10 and a heterogenous or "target" computer 12. As used herein, "heterogenous" refers to the fact that application program(s) 14a written for the source computer 10 cannot be run on the target computer 12 because computers 10 and 12 are incompatible at the hardware and/or software level. For example, and not by way of limitation, application programs 14a of the source computer 10 may comprise a set of procedural-based programs written in "C", "COBOL" or "ADA", whereas application programs 14b of the target computer 12 may comprise a set of knowledge-based programs written in "LISP". Or, source computer 10 may comprise a transaction processing system such as IBM's CICS (customer information control system) whereas the target computer 12 may include non-IBM hardware for running an expert system or the like. In both cases, application programs 14a or 14b are not capable of being transferred or "ported" to the incompatible computer 12 or 10, respectively.

Each of the computers 10 and 12 includes one or more integrated or distributed processors 16a-16n capable of receiving and manipulating data and generating outputs, operating system software 18 which controls the operation of the overall computer system, memory (e.g., a disc drive and a suitable disk storage) 20 for storing data and application programs, input/output devices (e.g., keyboards, printers, CRT's, etc.) 22 for enabling a user to interact with the system, database management system 24 for controlling access to and storage of data, communications system 26 for controlling communications to and from the computer system via network 29 for example, and journal system 28 for storing and retrieving data from a journal. Such elements are, of course, conventional in the prior art. As will be described below, the virtual interface architecture of the present invention provides the capability to port application programs 14a (normally compatible with the source computer 10) to the target computer 12 and vice-versa, without modifications or programming changes to such programs. As used herein, "virtual" is the opposite of "transparent" in the sense that something "transparent" appears to the user not to exist but in fact does, while something "virtual" appears to the user to exist but does not.

The objects of the invention are achieved by the novel virtual interface system 30 as shown in the simplified block diagram of FIG. 2. As discussed above, virtual interface system 30 enables the application programs 14a to be executed without regard to whether such programs are compatible with the processor(s) 16, operating system 18, storage devices 20, input/output devices 22, data access system 24, communications system 26 or journal system 28 of the target computer system 12. The present invention therefore provides complete application program independence from the hardware, operating system, language, database management system and network characteristics of a heterogenous computer system. In this way, the virtual interface system enables software applications to be environment-independent by masking differences in the physical and functional characteristics of the source and target computers.

Virtual interface system 30 comprises a number of functional elements: a pre-processor 32, a compiler 34 for generating object code compatible with (but not executable by) the operating system of the target computer 12, a link/edit processor 35 for linking various object code programs to create fully-resolved core image code ("EXEC CODE") executable by the operating system of the target computer, a blackboard switch logic 36, a partitioned storage area 38, and a plurality of independent processes 40a-40n for running in the one or more processors 16 of the target computer system 12. Each of the processes 40 comprises an independently schedulable unit of computation which, in conjunction with one or more other processes, carries out one or more "tasks" required by the application program. Each task therefore consists of one or more independent processes.

According to the invention, the blackboard switch logic 36 is controlled by the operating system 18 of the target computer 12 to generate the partitioned storage area 38, or "blackboard". As will be described, the blackboard switch logic 36 is the conduit for all communications to and from the processes 40a-40n and all such communications follow the same route: through the blackboard switch logic 36 to the partitioned storage area 38, or from the partitioned storage area through the blackboard switch logic. The routing of data and information through the blackboard switch logic 36 and the partitioned storage area 38 is controlled by the executable code ("EXEC CODE") output from the link/edit processor 35. As will be described, the executable code comprises linked object code programs representing (a) pre-processed program code of the application program, (b) a so-called virtual management interface ("VMI") 42, and (c) a plurality of process management interface modules 44a–44n. The object code representing the VMI 42 and the plurality of process management interface modules 44 is generated by the compiler 34.

According to the invention, the process management interface modules 44 control the processes 40 via the blackboard switch logic 36 and the partitioned storage area 38. Processes 40 and the executable code are capable of being executed in the target computer 12 but not in the source computer 10. As will be described, the blackboard switch logic 36 also includes security and encryption/decryption routines for preventing or limiting data access or retrieval from the partitioned storage area, a data compression routine for conserving available memory in the blackboard, and a routine for controlling inter-blackboard communications.

The operation of the virtual interface system 30 of FIG. 2 can now be described in connection with the flowchart of FIG. 3. In general, the virtual interface system enables application programs to run irrespective of the hardware environment. This is accomplished by masking the application program and operating system functional calls (written, for example, in "ADA," "C," "CICS," "COBOL," "LISP," "PROLOG," etc.) from the hardware by linking the code of the original application program to/from the hardware operating system. This masking is carried out by the pre-processor 32 and provides both the user/programmer and the hardware with what each expects to see even though they are communicating in two different languages.

In particular, the source code of an application 14a is applied to the pre-processor 32 of the virtual interface system 30 at step 46. Pre-processor 32 identifies the functional calls (i.e., tasks) in the program code and, at step 48, converts these functional calls to functional calls of the language native to the target computer (i.e., to the compiler 34). For example, if the application program 14a is a CICS application and the target computer is "C"-based, pre-processor 32 serves to format the CICS functional calls in the source code to "C" calls. The output of the pre-processor 32 is then supplied to the compiler 34 which, at step 50, compiles the "C" code into object code compatible with but not fully executable by the operating system 18 of the target computer 12. Although not shown in detail in FIG. 3, the pre-processor 32 also masks the hardware operating system functional calls to the original application program. Steps 46–50 represent a "development" mode of operation and may be carried out at any time in either the source or target computer.

At step 51, the object code corresponding to the pre-processed program code 32 is linked to the (previously generated) object codes of the VMI 42 and the process management interface modules 44. This linkage is carried out by the link/edit processor 35 in a conventional fashion known in the art. The resulting "EXEC CODE" comprises a plurality of calls to the virtual management interface 42 (and thus the process management interface modules) for carrying out the tasks required by the application program. At step 52, the "run-time" mode of operation is initialized. This causes the blackboard switch logic 36, at step 54, to generate the partitioned storage area 38 in a memory of the target computer 12. The blackboard switch logic 36 also functions, at step 56, to initialize the processes 40 and "attach" the processes to the partitioned storage area 38. As used herein, the "attaching" of processes refers to the assignment of a designated discrete portion of the partitioned storage area 38 for each process 40. Communications to and from each such process must therefore be addressed to the discrete portion of the partitioned storage area 38 designated by the blackboard switch logic 36 at step 56. In this manner, the blackboard switch logic 36 uses so-called "reserved spot" communication for data access to and from the partitioned storage area 38.

At step 58, a user of the target computer system 12 calls the software application for execution. This application, normally incompatible with the target computer 12, has been pre-processed, compiled and linked with the VMI and interface modules to generate executable code as previously described. At step 60, the blackboard switch logic 36 assigns the user to the partitioned storage area 38. A test 61 is then run to determine if use is authorized. This test uses the security routines of the blackboard switch logic 36. If use is authorized, processing begins. In particular, the executable code (and thus the virtual management interface 42) is run by the operating system 18 of the target computer 12 at step 62 to call one or more of the process management interface modules 44a–44n as required by the application software task(s). Each of the process management interface modules then communicates with the one or more processes 40a–40n via the blackboard switch logic 36 and blackboard 38 to perform the task.

It can be seen therefore that the interface system 30 uses a "virtual" architecture to perform program "tasks" using a plurality of machine-independent "interface" processes 40 which are interfaced to a plurality of process management interface modules via a switch logic-generated partitioned storage area. The process management interface modules 44 do not perform the tasks themselves, rather, they serve only to interface to those processes which actually do perform the tasks. This separation of the processes 40 from the process management interface modules 44 via the blackboard switch logic and blackboard advantageously enables the system 30 to provide application program portability and consistency across diverse computer environments to achieve the objects of the present invention.

Only the executable code and the interface processes 40 need be tailored to the target computer 12 environment. Moreover, the processes themselves can be located in one or more distributed processors 16a–16n of the target computer 12, thus facilitating the use of parallel processing techniques and fault tolerant processing.

Figure 4:
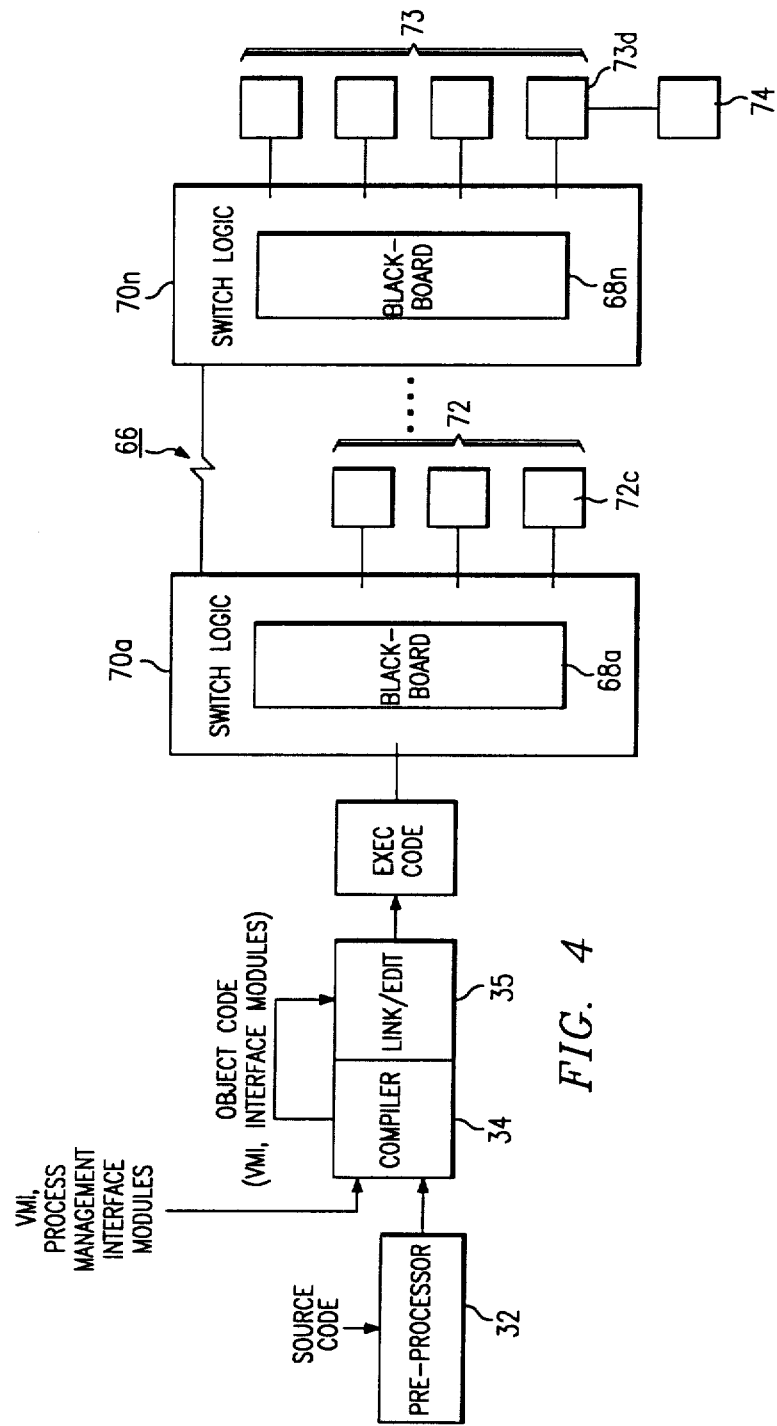
FIG. 4 is a simplified block diagram of a modified virtual interface of the invention wherein the target computer includes a distributed blackboard architecture having a plurality of partitioned storage areas.

Referring now to FIG. 4, an alternate embodiment of the virtual interface system is shown. In this embodiment, the target computer 12 includes two or more partitioned storage areas 68a–68n each generated and controlled by a corresponding blackboard switch logic 70a–70n in the manner previously described. In this architecture, each of the blackboards 68 has its own set 72 and 73 of processes and the identity of the processes in each set may differ from one blackboard to the next. Certain specified processes may thus be carried out in remote locations of the target computer via inter-switch logic communications over a network 66. According to another feature of the invention, data and control information is passed between the partitioned storage areas via the blackboard switch logic. Such communications are controlled by a blackboard-to-blackboard communications routine resident in the blackboard switch logic 36 associated with each blackboard. This operation is shown by way of example in FIG. 5.

In particular, assume that a process 73d is associated with the blackboard switch logic 70n of FIG. 4 and controls data access from a database 74. If a process 72c, for example, requires data from the database 74, the following steps are carried out. At step 76, process 72c directs a message to the blackboard switch logic 70a which then, through its blackboard-to-blackboard communications routine, places the message on the network 66. At step 78, the blackboard switch logic 70n receives the message and places it in a specific location of the blackboard 68n associated with the process 73d. Once notified of the message, process 73d is then carried out at step 80 to retrieve the data from the database 74. The required data is then appended to a message at step 82 and delivered, by the process 73d, back to the blackboard switch logic 70n. At step 84, the blackboard switch logic 70n uses its blackboard-to-blackboard communication routine to deliver the message over the network 66 back to the blackboard switch logic 70a. At step 86, the blackboard switch logic 70a places the message in the blackboard 68a at the location associated with the originating process 72c. At step 88, the message is retrieved by the Process 72c from the blackboard 68a.

Referring now back to FIG. 2, the plurality of interface processes 40 preferably include at least the following:

Data Access Interface Process ("DAI") 40a—for managing data access to and from a database management system 24 via one or more database interface processes (DBI);

Database Interface Process ("DBI") 40b—for storing and retrieving data from the database management system 24;

Presentation Interface Process ("PI") 40c—for controlling data presentation on the input/output devices 22 of the target computer system;

Journal Interface Process ("JI") 40d—for storing and retrieving data from the journal system 28 of the target computer system;

Task Storage Interface Process ("TSI") 40e—for controlling management and storage of data across tasks;

Storage Interface Process ("SI") 40f—for controlling data management within a task and data management between tasks; and Task Control Interface Process ("TCI") 40g—for controlling the initiation, delay, suspension or termination of a task.

The above processes, while exemplary, are not meant to be limiting. Data access interface process ("DAI") knows the symbolic (i.e., system) location of all data and uses one or more database interface processes to physically access such data. Moreover, with the exception of the storage and task control interface processes, each of the processes 40 cooperates with a corresponding process management interface module 44 in the manner previously described. For example, data access interface process ("DAI") 40a is controlled by a data access process management interface ("DAMI") module 44a which in turn is controlled by the virtual management interface ("VMI") 42. Likewise, presentation interface process ("PI") 40c cooperates with the PMI module 40c, and so forth.

Preferably, the storage interface process 40f and the task control interface process 40g are controlled by and communicate with the virtual management interface 42 via direct message exchanges rather than a blackboard. This scheme enables the virtual management interface 42 to exhibit direct or "action-centered" control of the SI and TCI processes.

In the preferred embodiment, data and/or control information is transferred (between tasks, between process management interface modules and processes, and between distributed blackboards) using the following "send" and "receive" message formats:

| SEND (data, length, command, bbid, iid) | |
| RECEIVE (data, length, command, bbid, iid); where | |
| --- | --- |
| data = | information |
| length = | length of data |
| command = | action required or "subclass" |
| bbid = | identification of blackboard |
| iid = | process identification or "class" (blackboard address) |

The following are representative program listings C Copyright 1987, VI Systems, Inc. showing (a) a preprocessor for receiving a CICS application program and in response thereto generating a pre-processed program, (b) an exemplary CICS test program, (c) the CICS test program following processing by the preprocessor, (d) the journal management interface module ("JMI") prior to compiling, (f) the journal interface process ("JI") prior to compiling and (g) the blackboard switch logic. The blackboard switch logic includes four functional components: a blackboard generation and process attachment routine, a routine for attaching a user and an associated task to the blackboard (including security), the reserved-spot communication routines (for processing the "SEND" and "RECEIVE" messages) and a blackboard-to-blackboard communications routine.

```
Copyright 1987, Virtual Interface Systems
/* VIRTUAL PREPROCESSOR */
{
#include     "PARS.h"
#include     "DMI.h"
#include     "PMI.h"
int state = 0;
int size;
char lang[20];
unsigned int tflag;
```

```
char string[40];
int jstate = 0;
        struct
        {
        char ptr[30];
         int  tf;
         int  lc;
        } ptr[10];
int pf;
int ln = 1;
int i;
struct
{
unsigned int cmd:3;
unsigned int func:5;
unsigned int mask:24;
}flag;
unsigned int *x = (unsigned int *)&flag;
%}
%p 4000
%a 10000
%o 8000
%e 1000
%n 1000
%%
[\n]      { ln++; if(state ==0) fprintf(yyout,"\n"); }
"EXEC CICS"/[" "\n]   { if (state != 0)
                        {
                        printf("ERROR in EXEC CICS command at line %d\n",ln);
                        state = 0;
                        }
                        else
                                {
                                state = 1;
                                for(i = 0; i < 8; i ++)
                                {
                                ptr[i].ptr[0] = '\0';
                                ptr[i].lc = 0;
                                ptr[i].tf = 0;
                                }
                                flag.mask = 0;
                                flag.cmd  = 0;
                                flag.func = 0;
                                tflag = 0;
                                jstate = 0;
                                pf = 0;
                        }
                    }
RETURN/[" "\n]   |
LINK/[" "\n]     |
XCTL/[" "\n]     |
ABEND/[" "\n]    |
SUSPEND/[" "\n]  |
DELAY/[" "\n]    |
ASKTIME/[" "\n]  |
"ISSUE DISCONNECT"/[" "\n]    { if ( state == 0)
                        fprintf(yyout,"%s",yytext);
                    else
                    {
                     if(state != 1)
                     {
                     printf("ERROR in EXEC CICS command at line %d\n",ln);
                     state = 0;
                     }
                     else
                     {
                             flag.cmd = 1;
                             state = 2;
                        if(strcmp(yytext,"RETURN") == 0)
                             flag.func = 1;
                        if(strcmp(yytext,"XCTL") == 0)
                             flag.func = 3;
                        if(strcmp(yytext,"LINK") == 0)
                             flag.func = 2;
                        if(strcmp(yytext,"ABEND") == 0)
                             flag.func = 4;
```

```
                        if(strcmp(yytext,"DELAY") == 0)
                                flag.func = 5;
                        if(strcmp(yytext,"ASKTIME") == 0)
                                flag.func = 6;
                        if(strcmp(yytext,"ISSUE DISCONNECT") == 0)
                                flag.func = 7;
                        }
                }
        }
ADDRESS/[" "\n]   |
INIT/[" "\n]    |
ASSIGN/[" "\n]    |
GETMAIN/[" "\n]   |
JOURNAL/[" "\n]   |
"HANDLE CONDITION"/[" "\n]        |
"HANDLE AID"/[" "\n]      |
"IGNORE CONDITION"/[" "\n]        |
"WAIT JOURNAL"/[" "\n] |
FREEMAIN/[" "\n] { if ( state == 0)
                        fprintf(yyout,"%s",yytext);
                  else
                  {
                    if(state != 1)
                    {
                    printf("ERROR in EXEC CICS command at line %d\n",ln);
                    state = 0;
                    }
                    else
                    {
                            flag.cmd = 0;
                            flag.func = 0;
                            state = 2;
                    if(strcmp(yytext,"INIT") == 0)
                    {
                            jstate = 1;
                    }
                    else
                    if(strcmp(yytext,"ADDRESS") == 0)
                            jstate = 1;
                    else
                    if(strcmp(yytext,"ASSIGN") == 0)
                            jstate = 1;
                    else
                    if(strcmp(yytext,"GETMAIN") == 0)
                            flag.func = 12;
                    else
                    if(strcmp(yytext,"FREEMAIN") == 0)
                            flag.func = 13;
                    else
                    if(strcmp(yytext,"WAIT JOURNAL") == 0)
                    {
                            flag.cmd = 4;
                            flag.func = 2;
                    }
                    else
                    if(strcmp(yytext,"HANDLE CONDITION") == 0)
                    {
                            flag.cmd = 6;
                            flag.func = 1;
                            jstate = 2;
                    }
                    else
                    if(strcmp(yytext,"HANDLE AID") == 0)
                    {
                            flag.cmd = 6;
                            flag.func = 2;
                            jstate = 2;
                    }
                    else
                    if(strcmp(yytext,"IGNORE CONDITION") == 0)
                    {
                            flag.cmd = 6;
                            flag.func = 3;
                            jstate = 2;
                    }
                    else
```

```
                            if(strcmp(yytext,"JOURNAL") == 0)
                            {
                                    flag.cmd = 4;
                                    flag.func = 1;
                            }
                            }
                    }
            }
SEND/[" "\n]         |
"ISSUE PRINT"/[" "\n]   |
"ISSUE COPY"/[" "\n]    |
"ISSUE ERASEAUP"/[" "\n]    |
"ISSUE RESET"/[" "\n]   |
RECEIVE/[" "\n]    { if ( state == 0)
                    fprintf(yyout,"%s",yytext);
                   else
                   {
                     if(state != 1)
                     {
                     printf("ERROR in EXEC CICS command at line %d\n",ln);
                     state = 0;
                     }
                     else
                     {
                             flag.mask |= DATA;
                             flag.mask |= MAP;
                             flag.cmd = 2;
                        if(strcmp(yytext,"SEND") == 0)
                             flag.func = 1;
                        if(strcmp(yytext,"ISSUE PRINT") == 0)
                             flag.func = 7;
                        if(strcmp(yytext,"ISSUE COPY") == 0)
                             flag.func = 8;
                        if(strcmp(yytext,"ISSUE ERASEAUP") == 0)
                             flag.func = 5;
                        if(strcmp(yytext,"RESET") == 0)
                             flag.func = 6;
                        if(strcmp(yytext,"RECEIVE") == 0)
                             flag.func = 11;
                             state = 2;
                     }
                   }
            }
WRITE/[" "\n]    |
REWRITE/[" "\n]  |
READNEXT/[" "\n]    |
DELETE/[" "\n]   |
UNLOCK/[" "\n]   |
LOCK/[" "\n]  |
ENQ/[" "\n]   |
DEQ/[" "\n]   |
STARTBR/[" "\n] |
READPREV/[" "\n]    |
RESETBR/[" "\n] |
ENDBR/[" "\n]   |
"READQ TS"/[" "\n]   |
"WRITEQ TS"/[" "\n]  |
"DELETEQ TS"/[" "\n] |
READQ/[" "\n]   |
WRITEQ/[" "\n]   |
DELETEQ/[" "\n]  |
"READQ TD"/[" "\n]   |
"WRITEQ TD"/[" "\n]  |
"DELETEQ TD"/[" "\n] |
READ/[" "\n]    { if ( state == 0)
                    fprintf(yyout,"%s",yytext);
                   else
                   {
                     if(state != 1)
                     {
                     if(strcmp(yytext,"REWRITE") == 0)
                     {
                     if(flag.func == 14 && flag.cmd == 3)
                     flag.mask |= RWRITE;
                     }
                     else
                     {
```

```
            printf("ERROR in EXEC CICS command at line %d\n",ln);
            state = 0;
          }
         }
         else
          {
           flag.cmd = 3;
           state = 2;
          if(strcmp(yytext,"DEQ") == 0)
                flag.func = 31;
          if(strcmp(yytext,"ENQ") == 0)
                flag.func = 30;
          if(strcmp(yytext,"READ") == 0)
                flag.func = 3;
          if(strcmp(yytext,"READNEXT") == 0)
                flag.func = 4;
          if(strcmp(yytext,"READPREV") == 0)
                flag.func = 5;
          if(strcmp(yytext,"RESETBR") == 0)
                flag.func = 6;
          if(strcmp(yytext,"ENDBR") == 0)
                flag.func = 7;
          if(strcmp(yytext,"STARTBR") == 0)
                flag.func = 8;
          if(strcmp(yytext,"DELETE") == 0)
                flag.func = 9;
          if(strcmp(yytext,"UNLOCK") == 0)
                flag.func = 2;
          if(strcmp(yytext,"LOCK") == 0)
                flag.func = 1;
          if(strcmp(yytext,"READQ TS") == 0
                || strcmp(yytext,"READQ") == 0)
                flag.func = 10;
          if(strcmp(yytext,"DELETEQ TS") == 0
                || strcmp(yytext,"DELETEQ") == 0)
                flag.func = 11;
          if(strcmp(yytext,"READQ TD") == 0)
                flag.func = 12;
          if(strcmp(yytext,"DELETEQ TD") == 0)
                flag.func = 13;
          if(strcmp(yytext,"WRITEQ TS") == 0
                || strcmp(yytext,"WRITEQ") == 0)
                flag.func = 14;
          if(strcmp(yytext,"WRITEQ TD") == 0)
                flag.func = 15;
          if(strcmp(yytext,"WRITE") == 0)
                flag.func = 16;
          if(strcmp(yytext,"REWRITE") == 0)
                flag.func = 17;
          }
         }
       }
[A-Z]* { if ( state == 0)
            fprintf(yyout,"%s",yytext);
        else
         {
          if(state == 4) goto state4;
          else
          if(state != 2)
          {
          printf("ERROR in EXEC CICS command at line %d\n",ln);
          state = 0;
          }
          else
           {
            if(flag.cmd == 6)
            {
              if((i =vcond(yytext)) == -1 )
                {
          printf("ERROR IN EXEC CICS COMMAND at line - %d\n",ln);
          printf("invalid CONDITION - %s\n",yytext);
              state = 0;
              goto end2;
            }
            fprintf(yyout,"_HS\[%d].hc = %d;\n",i,flag.func);
            switch(flag.func)
            {
```

```
    case 1: case 2:
    fprintf(yyout,"STATUS = %d;\n",i);
    fprintf(yyout,"_HCOND = 1;\n");
    fprintf(yyout,"if(setjmp(jbuf) == 0)\n");
    state = 3;
     break;
    case 3:
    state = 2;
    break;
    default: ;
    }
  }
else
 if(strcmp(yytext,"CAARG") == 0)
        {
        state = 3;
        pf = 1;
        ptr[pf].tf = 2;
        }
else
 if(strcmp(yytext,"CAMIB") == 0)
        {
         flag.func = 20;
        state = 3;
        pf = 1;
        ptr[pf].tf = 3;
        }
else
 if(strcmp(yytext,"CACOMMAREA") == 0)
        {
         flag.func = 21;
        state = 3;
        pf = 1;
        ptr[pf].tf = 3;
        }
else
 if(strcmp(yytext,"CSA") == 0)
        {
        state = 3;
        flag.func = 1;
        pf = 1;
        ptr[pf].tf = 2;
        }
else
 if(strcmp(yytext,"CWA") == 0)
        {
        state = 3;
        flag.func = 2;
        pf = 1;
        ptr[pf].tf = 2;
        }
else
if(strcmp(yytext,"TCTUA") == 0)
        {
        flag.func = 3;
        pf = 1;
        ptr[pf].tf = 2;
        state = 3;
        }
else
if(strcmp(yytext,"TWA") == 0)
        {
        flag.func = 4;
        pf = 1;
        ptr[pf].tf = 2;
        state = 3;
        }
else
if(strcmp(yytext,"CWALENG") == 0)
        {
        pf = 2;
        ptr[pf].tf = 5;
        flag.func = 5;
        state = 3;
        }
else
if(strcmp(yytext,"TCTUALENG") == 0)
```

```
            {
            flag.func = 7;
            pf = 2;
            ptr[pf].tf = 5;
            state = 3;
            }
    else
    if(strcmp(yytext,"TWALENG") == 0)
            {
            flag.func = 6;
            pf = 2;
            ptr[pf].tf = 5;
            state = 3;
            }
    else
        if(strcmp(yytext,"ABSTIME") == 0)
            {
            state = 3;
            pf = 2;
            ptr[pf].tf = 2;
            }
    else
        if(strcmp(yytext,"NUMITEM") == 0)
            {
            state = 3;
            pf = 3;
            ptr[pf].tf = 2;
            }
    else
        if(strcmp(yytext,"RESOURCE") == 0)
            {
            state = 3;
            pf = 3;
            ptr[pf].tf = 1;
            }
    else
        if(strcmp(yytext,"RIDFLD") == 0)
            {
            state = 3;
            pf = 3;
            ptr[pf].tf = 2;
            }
    else
        if(strcmp(yytext,"LENGTH") == 0)
          {
            state = 3;
            pf = 2;
            ptr[pf].tf = 4;
          }
    else
        if(strcmp(yytext,"PROGRAM") == 0)
            {
                    pf = 3;
                    ptr[pf].tf = 1;
                    state = 3;
            }
    else
        if(strcmp(yytext,"TRANSID") == 0)
            {
                    pf = 3;
                    ptr[pf].tf = 1;
                    state = 3;
            }
    else
        if(strcmp(yytext,"MAP") == 0)
            {
                    pf = 3;
                    ptr[pf].tf = 1;
                    state = 3;
                      flag.func += 1;
            }
    else
        if(strcmp(yytext,"MAPSET") == 0)
            {
                    pf = 5;
                    ptr[pf].tf = 1;
                    state = 3;
            }
```

```
    else
       if(strcmp(yytext,"DATASET") == 0)
          {
                pf = 5;
                ptr[pf].tf = 1;
                state = 3;
          }
    else
       if(strcmp(yytext,"QUEUE") == 0)
          {
                pf = 5;
                ptr[pf].tf = 1;
                state = 3;
          }
    else
       if(strcmp(yytext,"SYSID") == 0)
          {
                pf = 7;
                ptr[pf].tf = 1;
                state = 3;
          }
    else
         if(strcmp(yytext,"SET") == 0)
         {
         flag.mask |= SET;
         state = 3;
         tflag |= SET;
         pf = 1;
         ptr[pf].tf = 3;
         }
    else
         if(strcmp(yytext,"DATA") == 0)
         {
         state = 3;
         pf = 1;
         tflag |= DATA;
         ptr[pf].tf = 3;
         }
    else
         if(strcmp(yytext,"FROM") == 0)
         {
         state = 3;
         tflag |= FROM;
         pf = 1;
         ptr[pf].tf = 2;
         }
    else
         if(strcmp(yytext,"INTO") == 0)
         {
         state = 3;
         tflag |= INTO;
         pf = 1;
         ptr[pf].tf = 2;
         }
    else
         if(strcmp(yytext,"COMMAREA") == 0)
         {
         state = 3;
         pf = 1;
         ptr[pf].tf = 2;
         }
    else
         if(strcmp(yytext,"REQID") == 0)
         {
         state = 3;
         pf = 3;
         ptr[pf].tf = 2;
         }
    else
       if(strcmp(yytext,"ITEM") == 0)
         {
         state = 3;
         pf = 4;
         ptr[pf].tf = 4;
         }
```

```
else
  if(strcmp(yytext,"KEYLENGTH") == 0)
      {
      state = 3;
      pf = 4;
      ptr[pf].tf = 4;
      }
else
  if(strcmp(yytext,"JFILEID") == 0)
      {
      state = 3;
      pf = 4;
      ptr[pf].tf = 4;
      }
else
  if(strcmp(yytext,"JTYPEID") == 0)
      {
      state = 3;
      pf = 5;
      ptr[pf].tf = 1;
      }
else
  if(strcmp(yytext,"PFXLENG") == 0)
      {
      state = 3;
      pf = 7;
      ptr[pf].tf = 4;
      }
else
  if(strcmp(yytext,"PREFIX") == 0)
      {
      pf = 6;
      ptr[pf].tf = 1;
      state = 3;
      }
else
  if(strcmp(yytext,"GENERIC") == 0)
      flag.mask |= GENERIC;
else
  if(strcmp(yytext,"NEXT") == 0)
      flag.mask |= NEXT;
else
  if(strcmp(yytext,"NOSUSPEND") == 0)
      flag.mask |= NOSUSPEND;
else
  if(strcmp(yytext,"GTEQ") == 0 )
      flag.mask |= GTEQ;
else
  if(strcmp(yytext,"STARTIO") == 0 )
      flag.mask |= STARTIO;
else
  if(strcmp(yytext,"EQUAL") == 0 )
      flag.mask |= EQUAL;
else
  if(strcmp(yytext,"RBA") == 0 )
      flag.mask |= RBA;
else
  if(strcmp(yytext,"RRN") == 0 )
      flag.mask |= RRN;
else
  if(strcmp(yytext,"UPDATE") == 0)
      flag.mask |= UPDATE;
else
  if(strcmp(yytext,"MASSINSERT") == 0)
      flag.mask |= MASSINSERT;
else
  if(strcmp(yytext,"ERASEAUP") == 0)
      flag.mask |= ERASEAUP;
else
  if(strcmp(yytext,"ERASE") == 0)
      flag.mask |= ERASE;
else
  if(strcmp(yytext,"MAPONLY") == 0)
      flag.mask = flag.mask ^ DATA;
else
  if(strcmp(yytext,"DATAONLY") == 0)
      flag.mask = flag.mask ^ MAP;
```

```
                        else
                            if(strcmp(yytext,"CURSOR") == 0)
                                flag.mask |= CURSOR;
                        else
                            if(strcmp(yytext,"FREEKB") == 0)
                                flag.mask |= FREEKB;
                        else
                            if(strcmp(yytext,"FRSET") == 0)
                                flag.mask |= FRSET;
                        else
                            if(strcmp(yytext,"MAIN") == 0)
                                flag.mask |= MAIN;
                        else
                            if(strcmp(yytext,"ALARM") == 0)
                                flag.mask |= ALARM;
                        else
                            if(strcmp(yytext,"ALL") == 0)
                                flag.mask |= ALL;
                        else
                            if(strcmp(yytext,"ASIS") == 0)
                                flag.mask |= ASIS;
                        else
                            if(strcmp(yytext,"AUXILIARY") == 0)
                                flag.mask |= AUXILIARY;
                        else
                            if(strcmp(yytext,"LAST") == 0)
                                flag.mask |= LAST;
                        else
                            if(strcmp(yytext,"PAGING") == 0)
                                flag.mask |= PAGING;
                        else
                            if(strcmp(yytext,"WAIT") == 0)
                                flag.mask |= WAIT;
                        else
                            if(strcmp(yytext,"PRINT") == 0)
                                flag.mask |= PRINT;
                        else
                        {
                        printf("ERROR in EXEC CICS command at line %d\n",ln);
                        state = 0;
end2: ;
                        }
                    }
                }
            }
"("     { if ( state == 0)
                    fprintf(yyout,"%s",yytext);
                else
                    {
                     if(state != 3)
                     {
                     printf("ERROR in EXEC CICS command at line %d\n",ln);
                     state = 0;
                     }
                     else
                        {
                           state = 4;
                        }
                    }
            }
"END-EXEC"/[" "\n]  { if ( state == 0)
                    fprintf(yyout,"%s",yytext);
                else
                    {
                     if(state > 2)
                     {
                     printf("ERROR in EXEC CICS command at line %d\n",ln);
                     state = 0;
                     }
                     else
                        {
                           state = 0;
                        if()state == 0)
                           {
state6:
        for( i = 2; i < 8; i++)
        {
```

```
switch(i)
{
case 2:
if(ptr[i].lc)
flag.mask |= LC2;
 else
break;
case 3:
if(ptr[i].lc)
flag.mask |= LC3;
break;
case 4:
if(ptr[i].lc)
flag.mask |= LC4;

break;
case 5:
if(ptr[i].lc)
flag.mask |= LC5;
break;
case 6:
if(ptr[i].lc)
flag.mask |= LC6;
break;
case 7:
if(ptr[i].lc)
flag.mask |= LC7;
break;
}
}
 if(strcmp(lang,"c") == 0)
  {
  if(ptr[1].ptr[0] != '\0' && ptr[1].tf != 3 && flag.func != 0)
  fprintf(yyout,"_SPTR = (char *)%s;\n",ptr[1].ptr);
  }
 else
 {
 if(ptr[1].ptr[0] != '\0')
  {
  if(ptr[2].ptr[0] == '\0' && ptr[1].tf != 3 && flag.cmd == 3)
   {flag.mask |= LC2; flag.mask |= SLC2; ptr[2].lc = 6;
      }
  if(ptr[1].tf != 3 && flag.func != 0 )
   {
        strcpy(string,ptr[1].ptr);
        size = c2cob(string,ptr[1].tf);
        if(strcmp(ptr[1].ptr,"DFHCOMMAREA") == 0)
        ptr[1].tf = 3;
        else
        fprintf(yyout,"_SPTR = %s;\n",string);
    }

}
 if(ptr[3].ptr[0] != '\0')
  {
   if(ptr[4].ptr[0] == '\0' && flag.cmd == 3)
    { flag.mask |= LC4; flag.mask |= SLC4; ptr[4].lc = 6; }
  }
 }
 fprintf(yyout,"CAMI(%u",*x);
for( i = 1; i < 8; i++)
{
switch(ptr[i].lc)
{
case 1: case 2: case 6:
 fprintf(yyout,",\"%s\"",ptr[i].ptr);
  break;
 default:
    if(ptr[i].ptr[0] == '\0')
      fprintf(yyout,",0");
  else
  {
  if(strcmp(lang,"cobol") == 0)
   {
    size = c2cob(ptr[i].ptr,ptr[i].tf);
    if( size == 0)
    {
```

```
        printf("invalid argument %s in EXEC CICS at line %d\n",ptr[i].ptr,ln);
                goto end6;
                }
        if( i == 1)
        {
        if(ptr[2].lc == 6)
        sprintf(ptr[2].ptr,"%d",size);
        }
        if( i == 3)
        {
        if(ptr[4].lc == 6)
        sprintf(ptr[4].ptr,"%d",size);
        } if( (i == 1 && ptr[1].tf == 2) && flag.func != 0)
                fprintf(yyout,",\&_SPTR");
         else
        fprintf(yyout,",%s",ptr[i].ptr);
        }
            else
                switch(ptr[i].tf)
                { case 1: case 2:
                if( i == 1 && flag.func != 0)
                  fprintf(yyout,",\&_SPTR");
                   else
                  fprintf(yyout,",(char *)%s",ptr[i].ptr);
                  break;
                  default:
                  fprintf(yyout,",(char *)\&%s",ptr[i].ptr);
                  }
        } /* end switch */
   }
        fprintf(yyout,");\n");
end6:   for( i = 1; i < 8; i ++) ptr[i].ptr[0] = '\0';
/* print STS statement for loop ends here */
                        }
                } /* else condition ends here */
                        }
                }
[A-Za-z_][A-Za-z0-9_]*: {
                                fprintf(yyout,"%s\n",yytext);
                                fprintf(yyout,"if(_HCOND != 0) {\n");
                                fprintf(yyout,"if(setjmp(_HS[STATUS].jbuf) == 0) {\n")
                                fprintf(yyout,"_HCOND = 0; \n");
                                fprintf(yyout,"longjmp(jbuf,0);\n");
                                fprintf(yyout,"} } \n");
                                }
\&[A-Za-z_][A-Za-z0-9_\[\]\-]* ( if ( state == 0)
                        fprintf(yyout,"%s",yytext);
                        else
                        {
                         if(state != 4)
                         {
                         printf("ERROR in EXEC CICS command at line %d\n",ln);
                         state = 0;
                         }
                         else
                            {
                                state = 5;
                                 strcpy(ptr[pf].ptr,yytext);
                            }
                        }
                }
[A-Za-z_][A-Za-z0-9_\[\]\-]* ( if ( state == 0)
                        fprintf(yyout,"%s",yytext);
                        else
                        {
                         if(state != 4)
                         {
                         printf("ERROR in EXEC CICS command at line %d\n",ln);
                         state = 0;
                         }
                         else
                            {
```

```
state4:
                            state = 5;
                            if(flag.cmd == 6)
                            {
                                if(strcmp(lang,"cobol") == 0)
                                {
                                    if(glabel(string,yytext) == -1)
                                    {
                            printf("ERROR IN EXEC CICS COMMAND at line %d\n",ln);
                            printf("invalid paragraph or section name - %s\n");
                                    state = 0;
                                    goto end4;
                                    }
                                }
                                else
                                strcpy(string,yytext);
                                switch(flag.func)
                                {
                                case 1:
                                case 2:
                                fprintf(yyout," goto %s;\n",string);
                                break;
                                case 3:
                                break;
                                default: ;
                                }
                            }
                            else
                            strcpy(ptr[pf].ptr,yytext);
end4: ;
                        }
                }
        }
'[A-Za-z0-9_\-]*' { if ( state == 0)
        /* literals name */
                    fprintf(yyout,"%s",yytext);
                else
                    {
                     if(state != 4)
                     {
                    printf("ERROR in EXEC CICS command at line %d\n",ln);
                    state = 0;
                    }
                    else
                        {
                            state = 5;
                            if(ptr[pf].tf == 1 )
                            {
                                strcpy(string,yytext);
                                    string[yyleng - 1] = '\0';
                                    strcpy(ptr[pf].ptr, string+1);
                                    ptr[pf].lc = 1;
                            }
                                else
                                {
                            printf("ERROR in EXEC CICS command at line %d\n",ln
                            printf("invalid use of literal\n");
                            state = 0;
                                }
                        }
                    }
                }
[0-9]* { if ( state == 0)
                    fprintf(yyout,"%s",yytext);
                else
                    {
                     if(state != 4)
                     {
                    printf("ERROR in EXEC CICS command at line %d\n",ln);
                    state = 0;
                    }
                    else
                        {
                            state = 5;
                            if(ptr[pf].tf == 4)
                            {
```

```
                                    strcpy(ptr[pf].ptr,yytext);
                                    ptr[pf].lc = 2;
                                    }
                                    else
                                    {
                                printf("ERROR in EXEC CICS command at line %d\n",ln);
                                printf("invalid use of constant\n");
                                    state = 0;
                                    }
                                }
                            }
                        }
")"        ( if ( state == 0)
                                fprintf(yyout,"%s",yytext);
                            else
                            {
                             if(state != 5)
                             {
                             printf("ERROR in EXEC CICS command at line %d\n",ln);
                             state = 0;
                             }
                             else
                                {
                                    state = 2;
                                      if(jstate == 1) goto state6;
                                }
                            }
                        }

/* TEST PROGRAM    */ include "STSMAP1.h"
include "demotest.h"
#include "STATUS.h"
#include "handle.h"
#include "STS.h"
#include "CA.h"
main(argc,argv)
int argc;
char *argv[];
{
struct MENU1 *mm;
struct rec1 buf;
unsigned short length;
char *twaarea;
char dkey[10];
char yyy[10];
char dname[10];
char fdata[91];
char xxxx[50];
unsigned short dlength;
unsigned short plength;
unsigned short klength;
unsigned short jname;
int   yy;
char *data;
char *label;
data=(char *) &(buf);
strcpy(xxxx,"Demotest program Entry Point\n");
label=(char *)(xxxx);
EXEC CICS INIT CAARG(argv) CAMIB(CAMIB) CACOMMAREA(COMMAREA) END-EXEC
EXEC CICS ASSIGN TWALENG(length) END-EXEC
if(length > 0)
{
EXEC CICS ADDRESS TWA(twaarea) END-EXEC
}
EXEC CICS WRITEQ TD QUEUE('INQ1') FROM(label) LENGTH(40) END-EXEC
again:
EXEC CICS HANDLE CONDITION MAPFAIL (SMAP)
                           DUPREC(DUPRECORD)
                             ERROR(err_rtn)
```

```
END-EXEC
EXEC CICS IGNORE CONDITION NOTFND END-EXEC
EXEC CICS RECEIVE MAP('MENU1') MAPSET('STSMAP1') SET(aa) END-EXEC
for(yy=0;yy<9;yy++)
    dname[yy]='\0';
strncpy(dname,aa->FIELD1,8);
for(yy=0;yy<9;yy++)
    dkey[yy]=' ';
dkey[9]='\0';
strncpy(dkey,aa->FIELD2,aa->FIELD2L);
switch(aa->FIELD4[0])
{
case '1':
EXEC CICS LINK PROGRAM('demotran') END-EXEC
EXEC CICS SEND MAP('MENU1') MAPSET('STSMAP1') MAPONLY CURSOR ERASE END-EXEC
goto again;
case 's':
klength=10;
dlength=60;
EXEC CICS STARTBR KEYLENGTH(klength) RIDFLD(dkey) DATASET(dname)
END-EXEC
EXEC CICS READNEXT INTO(data) DATASET(dname)
LENGTH(dlength) END-EXEC
strncpy(aa->FIELD2,buf.keyfield,9);
strncpy(aa->FIELD3,buf.field2,50);
EXEC CICS SEND MAP('MENU1') MAPSET('STSMAP1')  CURSOR FROM(aa) END-EXEC
break;
case 'r':
klength=10;
dlength=60;
EXEC CICS READ INTO(data) KEYLENGTH(klength) RIDFLD(dkey) DATASET(dname)
LENGTH(dlength) END-EXEC
if(STATUS>0)
{
EXEC CICS SEND MAP('MENU1') MAPSET('STSMAP1') MAPONLY CURSOR ERASE END-EXEC
goto again;
}
strncpy(aa->FIELD2,buf.keyfield,9);
strncpy(aa->FIELD3,buf.field2,50);
aa->FIELD4[0]=' ';
strncpy(aa->FIELD1,"        ",8);
EXEC CICS SEND MAP('MENU1') MAPSET('STSMAP1')  CURSOR FROM(aa) END-EXEC
break;
case 'd':
klength=10;
dlength=60;
EXEC CICS READ INTO(data) KEYLENGTH(klength) RIDFLD(dkey) DATASET(dname)
LENGTH(dlength) UPDATE END-EXEC
if(STATUS>0)
{
EXEC CICS SEND MAP('MENU1') MAPSET('STSMAP1') MAPONLY CURSOR ERASE END-EXEC
goto again;
}
strncpy(aa->FIELD2,buf.keyfield,9);
strncpy(aa->FIELD3,buf.field2,50);
aa->FIELD4[0]=' ';
aa->FIELD4L=-1;
EXEC CICS SEND MAP('MENU1') MAPSET('STSMAP1')  CURSOR FROM(aa) END-EXEC
EXEC CICS RECEIVE MAP('MENU1') MAPSET('STSMAP1') SET(aa) END-EXEC
if(aa->FIELD4[0]=='d')
EXEC CICS DELETE DATASET(dname) END-EXEC
else
EXEC CICS UNLOCK DATASET(dname) END-EXEC
EXEC CICS SEND MAP('MENU1') MAPSET('STSMAP1') MAPONLY CURSOR ERASE END-EXEC
goto again;
case 'u':
klength=10;
dlength=60;
EXEC CICS READ INTO(data) KEYLENGTH(klength) RIDFLD(dkey) DATASET(dname)
LENGTH(dlength) UPDATE END-EXEC
if(STATUS>0)
{
EXEC CICS SEND MAP('MENU1') MAPSET('STSMAP1') MAPONLY CURSOR ERASE END-EXEC
goto again;
}
```

```
strncpy(aa->FIELD2,buf.keyfield,9);
strncpy(aa->FIELD3,buf.field2,50);
EXEC CICS SEND MAP('MENU1') MAPSET('STSMAP1')  CURSOR FROM(aa) END-EXEC
EXEC CICS RECEIVE MAP('MENU1') MAPSET('STSMAP1') SET(aa) END-EXEC
if(aa->FIELD3L>0 || aa->FIELD4[0]!='e')
{
strncpy(buf.field2,aa->FIELD3,49);
buf.field2[49]='\0';
EXEC CICS REWRITE DATASET(dname) FROM(data) LENGTH(dlength) END-EXEC
}
else
{
EXEC CICS UNLOCK DATASET(dname) END-EXEC
EXEC CICS SEND MAP('MENU1') MAPSET('STSMAP1') MAPONLY CURSOR ERASE END-EXEC
}
break;
case 'a':
dlength=60;
strncpy(buf.keyfield,dkey,9);
buf.keyfield[9]='\0';
strncpy(buf.field2,aa->FIELD3,49);
buf.field2[49]='\0';
EXEC CICS WRITE FROM(data) RIDFLD(dkey) DATASET(dname) LENGTH(dlength)
END-EXEC
EXEC CICS SEND MAP('MENU1') MAPSET('STSMAP1') MAPONLY CURSOR ERASE END-EXEC
break;
case 'e':
EXEC CICS RETURN
END-EXEC
}
goto again;
SMAP:
EXEC CICS SEND MAP('MENU1') MAPSET('STSMAP1') MAPONLY CURSOR ERASE END-EXEC
EXEC CICS RETURN TRANSID('test') END-EXEC
DUPRECORD:
printf("THIS IS DUP-KEY  HANDLE\n");
goto again;
err_rtn:
goto again;
}
/* TEST PROGRAM FOLLOWING PREPROCESSOR */ include "STSMAP1.h"
include "demotest.h"
#include "STATUS.h"
#include "handle.h"
#include "STS.h"
#include "CA.h"
main(argc,argv)
int argc;
char *argv[];
{
struct MENU1 *aa;
struct rec1 buf;
unsigned short length;
char *twaarea;
char dkey[10];
char yyy[10];
char dname[10];
char fdata[91];
char xxxx[50];
unsigned short dlength;
unsigned short plength;
unsigned short klength;
unsigned short jname;
int  yy;
char *data;
char *label;
data=(char *) &(buf);
strcpy(xxxx,"Demotest program Entry Point\n");
label=(char *)(xxxx);
  VMI(0,(char *)argv,0,0,0,0,0,0);
 VMI(335544320,(char *)&CAMIB,0,0,0,0,0,0);
 VMI(352321536,(char *)&COMMAREA,0,0,0,0,0,0);

VMI(100663296,0,(char *)&length,0,0,0,0,0);
```

```
if(length > 0)
{
_SPTR = (char *)twaarea;
VMI(67108864,&_SPTR,0,0,0,0,0,0);

}
    _SPTR = (char *)label;
VMI(1864634368,&_SPTR,"40",0,0,"INQ1",0,0);

again:
if(_HCOND != 0) {
if(setjmp(_HS[STATUS].jbuf) == 0) {
_HCOND = 0;
longjmp(jbuf,0);
} }

_HS[65].hc = 1;
STATUS = 65;
_HCOND = 1;
if(setjmp(jbuf) == 0)
  goto SMAP;
                                _HS[33].hc = 1;
STATUS = 33;
_HCOND = 1;
if(setjmp(jbuf) == 0)
  goto DUPRECORD;
                                _HS[87].hc = 1;
STATUS = 87;
_HCOND = 1;
if(setjmp(jbuf) == 0)
 goto err_rtn;

_HS[32].hc = 3;
     VMI(1275336968,(char *)&mm,0,"MENU1",0,"STSMAP1",0,0);

for(yy=0;yy<9;yy++)
    dname[yy]='\0';
strncpy(dname,mm->FIELD1,8);
for(yy=0;yy<9;yy++)
    dkey[yy]=' ';
dkey[9]='\0';
strncpy(dkey,mm->FIELD2,mm->FIELD2L);
switch(mm->FIELD4[0])
{
case '1':
    VMI(570687488,0,0,"demotran",0,0,0,0);

VMI(1107630096,0,0,"MENU1",0,"STSMAP1",0,0);

goto again;
case 's':
klength=10;
dlength=60;
    VMI(1744830464,0,0,(char *)dkey,(char *)&klength,(char *)dname,0,0);

_SPTR = (char *)data;
VMI(1677721600,&_SPTR,(char *)&dlength,0,0,(char *)dname,0,0);

strncpy(mm->FIELD2,buf.keyfield,9);
strncpy(mm->FIELD3,buf.field2,50);
        _SPTR = (char *)mm;
VMI(1107564816,&_SPTR,0,"MENU1",0,"STSMAP1",0,0);

break;
case 'r':
klength=10;
dlength=60;
        _SPTR = (char *)data;
VMI(1660944384,&_SPTR,(char *)&dlength,(char *)dkey,(char *)&klength,(char *)dname, if(STATUS>0)
  {
        VMI(1107630096,0,0,"MENU1",0,"STSMAP1",0,0);
```

```
goto again;
}
strncpy(aa->FIELD2,buf.keyfield,9);
strncpy(aa->FIELD3,buf.field2,50);
aa->FIELD4[0]=' ';
strncpy(aa->FIELD1,"        ",8);
        _SPTR = (char *)aa;
VMI(1107564816,&_SPTR,0,"MENU1",0,"STSMAP1",0,0);

break;
case 'd':
klength=10;
dlength=60;
        _SPTR = (char *)data;
VMI(1660952576,&_SPTR,(char *)&dlength,(char *)dkey,(char *)&klength,(char *)dname,' if(STATUS>0)
{
        VMI(1107630096,0,0,"MENU1",0,"STSMAP1",0,0);

goto again;
}
strncpy(aa->FIELD2,buf.keyfield,9);
strncpy(aa->FIELD3,buf.field2,50);
aa->FIELD4[0]=' ';
aa->FIELD4L=-1;
        _SPTR = (char *)aa;
VMI(1107564816,&_SPTR,0,"MENU1",0,"STSMAP1",0,0);

VMI(1275336968,(char *)&aa,0,"MENU1",0,"STSMAP1",0,0);

if(aa->FIELD4[0]=='d')
   VMI(1761607680,0,0,0,0,(char *)dname,0,0);

else
   VMI(1644167168,0,0,0,0,(char *)dname,0,0);

VMI(1107630096,0,0,"MENU1",0,"STSMAP1",0,0);

goto again;
case 'u':
klength=10;
dlength=60;
        _SPTR = (char *)data;
VMI(1660952576,&_SPTR,(char *)&dlength,(char *)dkey,(char *)&klength,(char *)dname,' if(STATUS>0)
{
        VMI(1107630096,0,0,"MENU1",0,"STSMAP1",0,0);

goto again;
}
strncpy(aa->FIELD2,buf.keyfield,9);
strncpy(aa->FIELD3,buf.field2,50);
        _SPTR = (char *)aa;
VMI(1107564816,&_SPTR,0,"MENU1",0,"STSMAP1",0,0);

VMI(1275336968,(char *)&aa,0,"MENU1",0,"STSMAP1",0,0);

if(aa->FIELD3L>0 || aa->FIELD4[0]!='e')
{
strncpy(buf.field2,aa->FIELD3,49);
buf.field2[49]='\0';
        _SPTR = (char *)data;
VMI(1895825408,&_SPTR,(char *)&dlength,0,0,(char *)dname,0,0);

}
else
{
   VMI(1644167168,0,0,0,0,(char *)dname,0,0);

VMI(1107630096,0,0,"MENU1",0,"STSMAP1",0,0);

}
 break;
```

```
case 'a':
dlength=60;
strncpy(buf.keyfield,dkey,9);
buf.keyfield[9]='\0';
strncpy(buf.field2,mm->FIELD3,49);
buf.field2[49]='\0';
        _SPTR = (char *)data;
VMI(1879048192,&_SPTR,(char *)&dlength,(char *)dkey,0,(char *)dname,0,0);

VMI(1107630096,0,0,"MENU1",0,"STSMAP1",0,0);

break;
case 'e':
  VMI(553648128,0,0,0,0,0,0,0);

}
goto again;
SMAP:
if(_HCOND != 0) {
if(setjmp(_HS[STATUS].jbuf) == 0) {
_HCOND = 0;
longjmp(jbuf,0);
} }

VMI(1107630096,0,0,"MENU1",0,"STSMAP1",0,0);

VMI(553910272,0,0,"test",0,0,0,0);

DUPRECORD:
if(_HCOND != 0) {
if(setjmp(_HS[STATUS].jbuf) == 0) {
_HCOND = 0;
longjmp(jbuf,0);
} } printf("THIS IS DUP-KEY  HANDLE\n");
goto again;
err_rtn:
if(_HCOND != 0) {
if(setjmp(_HS[STATUS].jbuf) == 0) {
_HCOND = 0;
longjmp(jbuf,0);
} } goto again;
}
/* VIRTUAL MANAGEMENT INTERFACE */ include "global.h"
int STATUS;
VMI(x,s1,s2,s3,s4,s5,s6,s7)
unsigned int x;
char **s1;
char *s2;
char *s3;
char *s4;
char *s5;
char *s6;
char *s7;
{
char string[20];
struct SFD flag;
unsigned int *pp;
pp = (unsigned int *)&flag;
*pp = x;
switch(flag.class)
{
case 0:
SMI(x,s1,s2,s3,s4,s5,s6,s7);
break;
case 1:
TMI(x,s1,s2,s3,s4,s5,s6,s7);
break;
case 2:
PMI(x,s1,s2,s3,s4,s5,s6,s7);
```

```
break;
case 3:
DAMI(x,s1,s2,s3,s4,s5,s6,s7);
break;
case 4:
JMI(x,s1,s2,s3,s4,s5,s6,s7);
break;
case 5:
ITCMI(x,s1,s2,s3,s4,s5,s6,s7);
break;
default: ;
}
return(STATUS);
}
/* JOURNAL MANAGEMENT INTERFACE MODULE */
#include         "global.h"
#include "CMHD.h"
JMI(x,buff,length,REQID,JFILEID,JTYPID,PREFIX,PFXLENG)
char *length;
char *JFILEID;
char **buff;
char *REQID;
char *JTYPID;
char *PREFIX;
char *PFXLENG;
unsigned int x;
{
char string[32];
struct CMHD cmd;
register int i;
int slength;
short found;
unsigned short size;
int err;
struct JMSGD *MSG;
char tstr[40];
struct SFD flag;
char path[60];
char asysid[4];
unsigned short plength;
unsigned int *p;
p = (unsigned int *)&flag;
*p = x;
MSG = (struct JMSGD *)TCA->MSG;
memset((char *)MSG,'\0',sizeof(struct JMSGD));
*(int *)MSG->IHD.dtid = TCA->tid;
TCA->MSG->IHD.tid = TCA->myid;
MSG->dbmask = TCA->MASK;
strncpy(asysid,TCA->SYSID,4);
strncpy(MSG->IHD.osysid,asysid,4);
strncpy(MSG->IHD.dsysid,asysid,4);
MSG->IHD.dtiid = 'j';
MSG->IHD.dfiid = 'j';
MSG->IHD.oiid = 'j';
cmd.req_typ = ' ';
switch(flag.func)
{
case 1: case 2:
plength = 0;
if(PFXLENG != NULL)
{
if(x & LC7)
plength = atoi(PFXLENG);
else
 memcpy((char *)&plength,PFXLENG,2);
memcpy(MSG->data,PREFIX,plength);
}
size = 0;
if(buff != NULL)
{
if(x & LC2)
size = atoi(length);
else    {
        if(length != NULL)
        memcpy((char *)&size,length,2);
        }
```

```c
if(size > 0)
{
MSG->length = size;
memcpy(&(MSG->data[plength]),*buff,size);
}
}
*(unsigned int *)&MSG->sid = x;
if(JFILEID != NULL)
{
if(x.& LC4)
MSG->JFILEID = atoi(JFILEID);
else
memcpy(MSG->JFILEID,JFILEID,2);
}
if(JTYPID != NULL)
{
MSG->JTYPID[0] = JTYPID[0];
MSG->JTYPID[1] = JTYPID[1];
}
slength = 36 + 8 + size + plength + 12;
cmd.req_typ = ' ';
SEND((char *)MSG,slength,&cmd,msysid);
MSG->sid.mask = 0;
rcv2:
cmd.req_typ = 't';
err =RECEIVE((char *)MSG,20000,&cmd,msysid,'j');
if(TCA->myid != TCA->MSG->IHD.tid) goto rcv2;
/* if REQID was provided then move to REQID */
TCA->status = MSG->sid.mask;
break;
default: TCA->status = INVREQ;
}
}

/* JOURNAL PROCESS */
#define     CBIDERR     19
#define     DISABLED    29
#define     DSIDERR     25
#define     DSSTAT      83
#define     DUPKEY      35
#define     DUPREC      33
#define     ENDDATA     53
#define     ENDFILE     30
#define     ENDINPT 4
#define     ENQBUSY     61
#define     ENVDEFERR   60
#define     EOC         21
#define     EODS 2
#define     EOF 3
#define     ERROR       87
#define     EXPIRED     57
#define     FUNCERR     84
#define     IGREQCD     18
#define     ILLOGIC     26
#define     INBFMH      22
#define     INCINVREQ   37
#define     INVERRTERM 67
#define     INVLDC      75
#define     INVMPSZ     66
#define     INVPARTN    73
#define     INVPARTNSET 74
#define     INVREQ  10
#define     INVTSREQ    56
#define     IOERR       31
#define     ISCINVREQ   47
#define     LENGERR 11
#define     MAPFAIL     65
#define     NONVAL      24
#define     NOPASSBKRD 16
#define     NOPASSBKWR 17
#define     NOSPACE     34
#define     NOSTART     23
#define     NOSTB       50
#define     NOTALLOC 9
#define     NOTAUTH     38
```

```
#define  NOTFND    32
#define  NOTOPEN   28
#define  OVERFLOW  79
#define  PARTNFAIL 72
#define  PGMIDERR  51
#define  QBUSY     45
#define  QIDERR    41
#define  QZERO     40
#define  RDATT     71
#define  RETPAGE   63
#define  ROLLEDBACK 62
#define  RTEFAIL   69
#define  RTESOME   68
#define  SELNERR   85
#define  SESSBUSY  8
#define  SESSIONERR 6
#define  SIGNAL    14
#define  SYSBUSY   7
#define  SYSIDERR  5
#define  TERMERR   20
#define  TERMIDERR 15
#define  TRANSIDERR 54
#define  TSIOERR   78
#define  UNEXPIN   76
#define  WRBRK     12
#define  JIDERR    101
#define  ITEMERR   100
#define  GENERIC   020000000
#define  RBA       002000000
#define  RRN       000200000
#define  UPDATE    000020000
#define  GTEQ      000002000
#define  MASSINSERT 000000200
#define  EQUAL     000000020
#define  DEBKEY    000000002
#define  DEBREC    040000000
#define  NUMERIC   004000000
#define  STARTIO   000400000
#define  NOSUSPEND 000040000
#define  NEXT      000004000
#define  MAIN      000000400
#define  LIT9      000000040
#define  LIT6      000000004
#define  WAIT      200000000
struct JMSGD
{
long atype;
char dsysid[4];
char dssys[4];
int  dtid;
char dtiid;
char dfiid;
char osysid[4];
char otid[4];
char otrid[4];
char otiid;
char ofiid;
char reqtype;  /* a - appc b - database s-system c -com */
char oiid;     /* orig. interface queue id */
short length;
unsigned int cad:3;
unsigned int func:5;
unsigned int mask:24; /* return status code in dbmask field */
int rmask;              /* encypted format to be implemented */
char jreq[4]; /* REQID[4] unique id assigned by STS by JMIQ */
unsigned short jf; /*  JFILEID       */
char    jtyp[2]; /* JTYPID[2] two bytes character data */
unsigned short pfxl;  /* PFXLENGi              */
unsigned short jlength;  /* length of from field users data */
char data[20000]; /* data[0] - PREFIX if provided
                     data[PFXLENG] - users data */

};
struct CMHD
        {
            unsigned  int timeout:16;
            unsigned  int cad:8;
```

```c
            unsigned int req_typ:8;
        };
struct journal
{
unsigned int jrid:7;      /* Max. 100 journal files     */
unsigned int jrst:1;      /* Disabled =0 Enabled =1     */
unsigned int bufsize:15;  /* flush when size in buffer  */
unsigned int status:1;    /* 0 = disabled  1 = enabled  */
unsigned int i_o:1;       /* 0 = input  1 = input-output */
unsigned int crit:1;      /* 0 = not critical 1 - critical */
unsigned int pause:1;     /* 0 = no pause   1 = pause   */
unsigned int retry:1;     /* 0 = no retry   1 = retry   */
unsigned int fill:4;      /* Reserved for future use    */
unsigned int sec;         /* security mask              */
char         jrname[32];  /* path name of log           */
};
struct jnl
{
unsigned int jrid:7;      /* Max. 100 journal files     */
unsigned int jrst:1;      /* Disabled =0 Enabled =1     */
unsigned int bufsize:15;  /* flush when size in buffer  */
unsigned int status:1;    /* 0 = disabled  1 = enabled  */
unsigned int i_o:1;       /* 0 = input  1 = input-output */
unsigned int crit:1;      /* 0 = not critical 1 - critical */
unsigned int pause:1;     /* 0 = no pause   1 = pause   */
unsigned int retry:1;     /* 0 = no retry   1 = retry   */
unsigned int fill:4;      /* Reserved for future use    */
unsigned int bl:15;       /* counter of data in buffer  */
unsigned int sec;         /* security mask              */
int          fprt;
char         *buf;
};
#define OK 0
struct jnl j[100];
int j_on;
main(argc,argv)
int argc;
char *argv[];
{
        int yy;
        int rsize;
        int l;
        struct JMSGD  *r;
        struct CMHD   *cd;
        struct journal *jr;
        int ap;
        int jrtbl;
        int total;
        int sflag;
        int wflag;
        close(2);
        close(0);
            printf("STS-JRC0003 - JOURNAL INTERFACE STARTED\n");
        if((jrtbl=open("JRN.STS",0))<0)
        {
            printf("STS-JRC0001 - CAN NOT OPEN STS JOURNAL TABLE -   JRN.STS\n");
            printf("STS-JRC0002 - NO JOURNALS OR LOGGING ACTIVE\n");
            j_on=0;
        }
        else
        {
            j_on=1;
            jr= (struct journal *) calloc(1,sizeof (struct journal));
            rsize=sizeof(struct journal);
            while((rsize=read(jrtbl,(char *) jr,rsize))== sizeof(struct journa
            {
                if(jr->status==1)
                {
                    ap=jr->jrid;
                    j[ap].status=1;
                    j[ap].bufsize=jr->bufsize;
                    j[ap].sec=jr->sec;
                    j[ap].crit=jr->crit;
                    j[ap].i_o=jr->i_o;
                    j[ap].pause=jr->pause;
```

```c
                            j[ap].retry=jr->retry;
                            j[ap].buf = (char *) calloc(1,2000);
                            if(total<18)
                            {
                                    if((j[ap].fprt=open(jr->jrname,1))<0)
                                    {
                                            if(j[ap].crit==1)
                                            {
                                                    printf("Required Journal n
                                                    exit();
                                            }
                                            j[ap].status=0;
                                    }
                                    else
                                    {
                                            total++;
                                            j[ap].status=1;
                                    }
                            }
                    }
            }
            close(jrtbl);
            free(jr);
    }
    r=(struct JMSGD *) calloc(1,sizeof(struct JMSGD));
    cd=(struct CMHD *) calloc(1,sizeof(struct CMHD));
    for(;;)
    {
again:
            cd->req_typ = ' ';
            if((l=RECEIVE((char *)r,20000,cd,argv[1],argv[2][0]))==-1)
            {
                    r->mask=INVREQ;
                    SEND((char *)r,1,cd,argv[1]);
                    goto again;
            }
            if(r->dfiid=='d')
                    cd->req_typ = 'd';
            else
                    cd->req_typ = 't';
            if(j_on==0 )
            {
               if(cd->req_typ != 'd')
                  {
                    r->mask=OK;
                    SEND((char *)r,1,cd,argv[1]);
                    goto again;
                  }
                goto again;
            }
            if(cd->req_typ != 'd' && jrsecr(r->rmask)!=OK)
            {
                    r->mask=NOTAUTH;
                    SEND((char *)r,1,cd,argv[1]);
                    goto again;
            }
            if(j[r->jf].status== 0)
            {
               if(cd->req_typ != 'd')
                  {
                    r->mask=JIDERR;
                    SEND((char *)r,1,cd,argv[1]);
                    goto again;
                  }
                goto again;
            }
            switch(r->func)
            {
            case 1:
                    if(j[r->jf].bl + 10 + r->jlength > 20000)
                    {
                            write(j[r->jf].fprt,j[r->jf].buf,j[r->jf].bl);
                            j[r->jf].bl=0;
                    }
                    memcpy(&(j[r->jf].buf[j[r->jf].bl]),"ZZZZ",4);
```

```
                        j[r->jf].bl = j[r->jf].bl +4;
                        memcpy(&(j[r->jf].buf[j[r->jf].bl]),(char *) &(r->dtid),4);
                        j[r->jf].bl = j[r->jf].bl +4;
if(r->jreq[0]!='\0')
{
memcpy(&(j[r->jf].buf[j[r->jf].bl]),r->jreq,4);
j[r->jf].bl = j[r->jf].bl +4;
}
if(r->jtyp[0]!='\0')
{
                        memcpy(&(j[r->jf].buf[j[r->jf].bl]),r->jtyp,2);
                        j[r->jf].bl = j[r->jf].bl +2;
}
                        memcpy(&(j[r->jf].buf[j[r->jf].bl]),"+",1);
                        j[r->jf].bl++;
if(r->data[0]!='\0')
{
                        memcpy(&(j[r->jf].buf[j[r->jf].bl]),r->data,r->jlength);
                        j[r->jf].bl = j[r->jf].bl + r->jlength;
}
        if(r->mask & STARTIO == STARTIO)
        {
                sflag=1;
                if(r->mask & WAIT == WAIT)
                        wflag=1;
                else
                        wflag=0;
                break;
        }
        if(r->mask & WAIT == WAIT)
                wflag=1;
        else
                wflag=0;
        break;
    case 2:
        if(j[r->jf].bl>0)
                write(j[r->jf].fprt,j[r->jf].buf,j[r->jf].bl);
        j[r->jf].bl=0;
        break;
    default:
        r->mask=INVREQ;
        SEND((char *)r,l,cd,argv[1]);
    }
    if(cd->req_typ!='d')
    {
        if(wflag == 1)
        {
                write(j[r->jf].fprt,j[r->jf].buf,j[r->jf].bl);
                r->mask=OK;
                l=48;
                SEND((char *)r,l,cd,argv[1]);
                j[r->jf].bl=0;
                wflag=0;
                sflag=0;
                goto again;
        }
        if(sflag==1)
        {
                r->mask=OK;
                l=48;
                SEND((char *)r,l,cd,argv[1]);
                write(j[r->jf].fprt,j[r->jf].buf,j[r->jf].bl);
                j[r->jf].bl=0;
                sflag=0;
                goto again;
        }
        r->mask=OK;
        l=48;
        SEND((char *)r,l,cd,argv[1]);
    }
    wflag=0;
    sflag=0;
        if(j[r->jf].bl > j[r->jf].bufsize);
                write(j[r->jf].fprt,j[r->jf].buf,j[r->jf].bl);
        j[r->jf].bl=0;
    }
}
```

```c
/* BLACKBOARD GENERATION AND INTERFACE PROCESS ATTACHMENT */ include <stdio.h>
include <signal.h>
#include "START.h"
#include "global.h"
#include        <sys/types.h>
#include        <sys/ipc.h>
#include        <sys/shm.h>
#include <sys/msg.h>
char *shmat();
char *nargv[6];
main(argn,argv)
char argn;
char *argv[];
{
int shmid;
int size;
char *ptr,*nptr;
key_t key;
int i,fd;
FILE *fp;
char string[40];
long offset;
int len;
unsigned short id;
short found;
umask();
signal(SIGINT,SIG_IGN);
signal(SIGHUP,SIG_IGN);
signal(SIGQUIT,SIG_IGN);
if(argn < 2)
{
printf("missing arguments\n");
printf("FORMAT IS - START 'SYSTEM' \n");
exit();
}
if(strlen(argv[1]) < 4)
{
printf("Invalid 'SYSTEM' name\n");
exit();
}
if((fp = fopen("/usr/STSCOMMON/CONFIG.STS","r+")) == NULL)
{
printf("Missing config file\n");
exit();
}
found = false;
while( fgets((char *)&config,80,fp) != NULL)
{
len = strlen(config.name);
config.del1 = '\0';
config.del2 = '\0';
config.del3 = '\0';
for(i = 0; i < 4; i++)
if(config.name[i] == ' ') config.name[i] = '\0';
if(strcmp(argv[1],config.name) == 0) { found = true; break; }
}
if(found == false)
{
printf("Invalid 'SYSTEM' name\n");
exit();
}
if(strcmp(config.rflag,"off") == 0)
{
printf("SYSTEM %s is marked off in configuration file\n",argv[1]);
exit();
}
if(config.flag == '0')
{
size = 4096;
/* create CSA area & get the pgm table */
strcpy(string,"/usr/STSCOMMON/");
strcat(string,argv[1]);
key =ftok(string,'2');
shmid = shmget(key,size,01666);
```

```c
if(shmid == -1)
{
printf(" STS unable to create CWA area \n");
exit();
}
key =ftok(string,'1');
shmid = shmget(key,size,01666);
if(shmid == -1)
{
printf(" STS unable to create CSA area \n");
}
ptr =  shmat(shmid,0,NULL);
config.name[len -1] = '\0';
strcpy(string,config.path);
chdir(string);
strcat(string,"/PLM.STS");
if((fd = open(string,0)) < 1)
{
printf("Missing PLM.STS file   \n");
exit();
}
read(fd,ptr,4096);
close(fd);
config.flag = '1';
offset = -len;
fseek(fp,offset,1);
config.del1 = ':';
config.del2 = ':';
config.del3 = ':';
for(i = 0; i < 4; i++)
if(config.name[i] == '\0') config.name[i] = ' ';
strcat(config.path,"\n");
#ifdef STSDEBUG
printf("len= %d\n",len);
#endif
i = 1;
fwrite((char *)&config,len,i,fp);
fclose(fp);
printf("STS SYSTEM %s is started\n",argv[1]);
}
else
{
printf("STS SYSTEM %s is already running\n",argv[1]);
exit();
}
nargv[0] = argv[0];
nargv[1] = argv[1];
nargv[2] = "d";
config.name[len -1] = '\0';
nargv[3] = config.path;
nargv[4] = '\0';
if(fork() == 0)
execv("dbinit",nargv);
nargv[2] = "j";
if(fork() == 0)
execv("jdinit",nargv);
nargv[2] = "q";
if(fork() == 0)
execv("tdinit",nargv);
/*
nargv[2] = "c";
if(fork() == 0)
execv("ciinit",nargv);
nargv[2] = "a";
if(fork() == 0)
execv("tsinit",nargv);
*/
}
/* ATTACHES USER AND ASSOCIATED TASK TO BLACKBOARD (WITH SECURITY)  */ include <signal.h>
include "logon.h"
#include        "global.h"
#include        "START.h"
#include        <sys/types.h>
```

```c
#include        <sys/ipc.h>
#include        <sys/shm.h>
#include <sys/msg.h>
char *nargv[3];
struct logon logon;
int pv;
int pcnt;
main(argn,argv)
char argn;
char *argv[];
{
int shmid;
unsigned int smask;
int shmid1;
int shmid3;
int size;
short found;
short efound;
short len;
char *ptr,*nptr;
key_t key;
int status;
int fd,i;
int fds, j;
FILE *fp;
char string[40];
char string1[256];
char path[40];
char tstr[12];
unsigned short id;
umask();
if(argn < 1)
{
printf("missing arguments\n");
printf("FORMAT IS - STS 'SYSTEM' \n");
exit();
}
if((fp = fopen("/usr/STSCOMMON/CONFIG.STS","r")) == NULL)
{
printf("Missing config file\n");
exit();
}
if(strlen(argv[1]) < 4)
{
printf(" Invalid SYSTEM name - must be atleast four character long\n");
exit();
}
found = false;
while( fgets((char *)&config,80,fp) != NULL)
{
len = strlen(config.name);
config.del1 = '\0';
config.del2 = '\0';
config.del3 = '\0';
for(i=0; i < 4;i++)
if(config.name[i] == ' ')config.name[i] = '\0';
if(strcmp(argv[1],config.name) == 0) { found = true; break; }
}
if(found == false)
{
printf("Invalid 'SYSTEM' name\n");
exit();
}
fclose(fp);
if(strcmp(config.rflag,"off") == 0)
{
printf("SYSTEM %s is marked off in configuration file\n",argv[1]);
exit();
}
if(config.flag == '0')
{
printf("SYSTEM %s is not running\n",argv[1]);
}
if((fd = open("/usr/STSCOMMON/LOGON.STS",0)) < 1)
{
```

```c
printf("Missing STS logon file\n");
exit();
}
for( pcnt = 0; pcnt < 5; pcnt++)
{
printf("STS logon:");
scanf("%s",string);
found = false;
if(strcmp(string,"exit") == 0)
{
printf("goodbye\n");
exit(0);
}
lseek(fd,0L,0);
while((pv = read(fd,(char *)&logon,sizeof(struct logon))) != 0)
{
pv = false;
if(strcmp(string,logon.name) == 0)
{
pv = true;
system("stty -echo");
printf("STS Password:");
scanf("%s",string);
system("stty echo");
if(strcmp(string,logon.passwd) == 0)
        {
        found = true;
        break;
        }
else
printf("\nInvalid Password\n");
 }
}
if(found == true) break;
if(pv == false)
printf("\nInvalid logon \n");
}
if(found == false)
{
printf(" Sorry\n");
exit();
}
close(fd);
printf("\n");
signal(SIGCLD,SIG_IGN);
size = 4096;
/* create CSA area & get the pgm table */
strcpy(string,"/usr/STSCOMMON/");
strcat(string,argv[1]);
key =ftok(string,'1');
/* get CSA area */
shmid = shmget(key,size,01666);
if(shmid == -1)
{
printf(" STS unable to access CSA area \n");
exit();
}
key =ftok(string,'2');
shmid1 = shmget(key,size,01666);
if(shmid1 == -1)
{
printf(" STS unable to create CWA area \n");
exit();
}
strcpy(string,ttyname(0));
strcpy(path,string);
nargv[0] = path;
nargv[1] = '\0';
key =ftok(string,'1');
shmid3 = shmget(key,MAXMEM,01666);
if(shmid3 == -1)
{
printf(" STS unable to access TCA area \n");
exit(0);
}
```

```
TCA   = (struct TCAD *)shmat(shmid3,0,NULL);
pgm   = (struct pgmd *)shmat(shmid,0,NULL);
TCA->CSAID = shmid;
strncpy(TCA->SYSID,argv[1],4);
TCA->CWAID = shmid1;
TCA->level = 1;
/*
TCA->TWAID = 0;
TCA->cwaid = 0;
*/
TCA->tid = key;
TCA->MASK = logon.mask;
TCA->ie_os = logon.offset;
TCA->ie_sec = logon.ie_sec;
strcpy(TCA->DID,path);
len = strlen(config.path);
config.path[len-1] = '\0';
chdir(config.path);
fd = open("LM.STS",0);
fds = open("/usr/STSCOMMON/IESEC.STS",0);
if((i = TRMID(TCA->TRMID,path,TCA->MASK)) != 0)
{
switch(i)
{
case 1:
printf("can not open TERM DEFINITION FILE TRM.STS\n");
exit();
break;
case 2:
printf("missing terminal definition in the TRM.STS file\n");
exit();
break;
case 3:
printf("Security violation - Permission Denied\n");
exit();
break;
}
}
TCA->type = 0;
tstr[8] = '\0';
TCA->myid = 0;
string[4] = '\0';
for(;;)
{
fflush(stdin);
printf("Enter Task ID:");
memset(string1,'\0',256);
tstr[4] = '\0';
gets(string1);
memcpy(string,string1,4);
if(strlen(string1) < 4) { printf("INvalid task ID\n"); goto ender; }
if(strcmp(string,"exit") == 0) break;
found = false;
for(i = 0; i < PTSIZE; i++)
{
memcpy(tstr,pgm->pgm[i].exec_verb,4);
#ifdef STSDEBUG
printf("value of task =%s\n",tstr);
#endif
if(strcmp(tstr,string) == 0) { found = true; break; }
}
if(found == false)
{
printf("Invalid Task ID\n");
goto ender;
}
if(pgm->pgm[i].sec_mask)
{
if(TCA->ie_sec)
{
lseek(4,TCA->ie_os,0);
if(TCA->MASK & _IES)
{
efound = false;
while((j = read(4,string,4)) != 0 && memcmp(string,"----",4) != 0)
```

```
{
if(memcmp(string,tstr,4) == 0) { efound = true; break; }
}
}
else
{
efound = true;
while((j = read(4,string,4)) != 0 && memcmp(string,"----",4) != 0)
{
if(memcmp(string,tstr,4) == 0) { efound = false; break; }
}
}
if(efound == false)
 { printf("Task is not authorized  to run\n"); goto ender; }
}
if((TCA->MASK & _ES) || (pgm->pgm[i].sec_mask & _ES))
{
smask = TCA->MASK & _ES;
if((pgm->pgm[i].sec_mask & smask) != pgm->pgm[i].sec_mask)
 { printf("Task is not authorized  to run\n"); goto ender; }
}
else
 { printf("Task is not authorized  to run\n"); goto ender; }
}
TCA->tptr = i;
memcpy(TCA->rmbuf,string1,strlen(string1));
TCA->rrcv = 1;
TCA->flag |= RRECVD;
TCA->pptr = i;
TCA->AID = '\'';
TCA->myid = TCA->myid + 1;
TCA->memlist.mnext = (STS_mp *)&(TCA->madr);
TCA->memlist.mnext->mlen = MAXMEM - sizeof(struct TCAD) - 4;
TCA->madr = (int *)TCA;
TCA->madr = TCA->madr+((MAXMEM-sizeof(struct TCAD) - 4)/4);
memcpy(tstr,pgm->pgm[i].phy_verb,8);
if(fork() == 0)
execv(tstr,nargv);
wait(&status);
ender: ;
}
if(TCA->TWAID != 0 && TCA->TWAID != -1)
shmctl(TCA->TWAID,IPC_RMID,NULL);
if(TCA->cwaid != 0 && TCA->cwaid != -1)
shmctl(TCA->cwaid,IPC_RMID,NULL);
shmctl(shmid3,IPC_RMID,NULL);
exit(0);
/* RESERVED SPOT BLACKBOARD COMMUNICATION ROUTINES */ include <sys/types.h>
include <sys/ipc.h>
#include "CMHD.h"
#include <sys/msg.h>
#define NULL 0
#define NOWAIT 01
struct msgbuf1
{
long mtype;
char mtext[65535];
};
RECEIVE(data,length,cmd,sysid,iid)
char *data;
struct CMHD *cmd;
int length;
char *sysid;
char iid;
{
struct msgbuf1 *msgp;
long msgtyp;
int msqid;
int rtrn;
key_t key;
int msgflg;
char *xx;
char string[40];
```

```
msgflg = 0;
msgflg |= MSG_NOERROR;
strcpy(string,"/usr/STSCOMMON/");
strncat( string,sysid,4);
key =ftok(string,iid);
msqid = msgget(key,01666);
msgp = (struct msgbufl *)data;
if(cmd->req_typ == 't') msgtyp = *(int *) &(data[12]);
else
msgtyp = 1;
xx = (char *)msgp;
if(cmd->cmd & NOWAIT)
msgflg |= IPC_NOWAIT;
rtrn = msgrcv(msqid,msgp,length,msgtyp,msgflg);
return(rtrn);
}
/* RESERVED SPOT BLACKBOARD COMMUNICATION ROUTINES */ include <stdio.h>
include <sys/types.h>
include <sys/ipc.h>
#include "CMHD.h"
#include <sys/msg.h>
#define NULL 0
#define NOWAIT 01
FILE *CTRACE;
struct msgbufl
{
long atype;
char atext[65535];
};
SEND(data,length,cmd,sysid)
char *data;
int length;
struct CMHD *cmd;
char *sysid;
{
int rtrn;
int msqid;
key_t key;
char string[40];
char asysid[10];
struct msgbufl *msgp;
msgp = (struct msgbufl *)data;
memset(asysid,'\0',10);
strncpy(asysid,&(data[4]),4);
switch(cmd->req_typ)
{
case 't':
        msgp->atype = 0;
        break;
case 'r':
        msgp->atype = 1;
        string[0] = data[16];
        data[17] = data[16];
        data[17] = string[0];
        break;
break;
/* DBMSQ or CI */
case 'v': case 's': case 'c': case 'j':
        if(cmd->req_typ == 'c')
        strncpy(&(data[4]),sysid,4);
        msgp->atype = 1;
        data[16] = cmd->req_typ;
        if(data[17] != 'c')
        data[17] = data[33];
        break;
default:
        data[16] = data[33];
        msgp->atype = 1;
}
if(msgp->atype == 0) msgp->atype = *(int *)&(data[12]);
strcpy(string,"/usr/STSCOMMON/");
strncat(string,asysid,4);
key = ftok(string,data[16]);
```

```
msqid = msgget(key,01666);
if(cmd->cmd & NOWAIT)
return(msgsnd(msqid,msgp,length,IPC_NOWAIT));
else
return(msgsnd(msqid,msgp,length,NULL));
}
/* BLACKBOARD-TO-BLACKBOARD SWITCHING */ include     "global.h"
include "CMHD.h"
struct CID
       {
       MSG_T IHD;
       char data[20000];
       };
main(narg,argv)
int narg;
char *argv[];
{
extern int errno;
char string[32];
struct CMHD cmd;
register int i;
int slength;
short found;
int size,ksize;
struct SFD *flag;
int length;
char path[256];
char *data;
struct CID CI;
data = (char *)&CI;
for(;;)
{
cmd.req_typ = ' ';
length = RECEIVE(data,20000,&cmd,argv[1],argv[2][0]);
if(strncmp(argv[1],CI.IHD.dsysid,4) != 0)
{
memcpy(CI.IHD.osysid,CI.IHD.dsysid,4);
memcpy(CI.IHD.dsysid,argv[1],4);
memcpy(string,&(data[4]),14);
memcpy(&(data[4]),&(data[18]),14);
memcpy(&(data[18]),string,14);
memset(string,'\0',10);
memcpy(string,CI.IHD.dsysid,4);
cmd.req_typ = 'c';
CI.IHD.dfiid = 'c';
CI.IHD.reqtype = ' ';
}
else
{
        if(CI.IHD.dfiid == 'c' && CI.IHD.dtiid == 'c')
        {
        cmd.req_typ = ' ';
        }
        else
        {
        memcpy(string,&(data[4]),14);
        memcpy(&(data[4]),&(data[18]),14);
        memcpy(&(data[18]),string,14);
        memset(string,'\0',10);
        memcpy(string,CI.IHD.dsysid,4);
        cmd.req_typ = 'c';
        CI.IHD.dfiid = 'c';
        }
}
SEND(data,length,&cmd,string);
}
}
```

Although the invention has been described and illustrated in detail, the same is by way of example only and should not be taken by way of limitation. The spirit and scope of the present invention are limited only to the terms of the appended claims.

We claim:

1. A method, using a virtual software machine, for providing a virtual execution environment in a target computer for an application software program having one of more execution dependencies that are incompatible with a software execution environment on the target computer, the virtual software machine comprising a plurality of autonomous and independent processes, pre-processing means, a first program means, and a virtual control mechanism having a virtual management interface (VMI) for generating requests for execution to the plurality of independent processes and receiving results of such processing, comprising the steps of:

a) identifying, by the pre-processing means, at least one execution dependency of the application software program and in response thereto using the pre-processing means to generate a pre-processed application software program which isolates the identified execution dependency from the application software program;

b) converting, by a compiler means of the target computer, the pre-processed application software program and the virtual control mechanism into object codes;

c) integrating by a link/edit means of the target computer, the object codes of the pre-processed application software program and the virtual control mechanism is substituted for the identified execution dependency of the application software program;

d) generating, by the first program means, a storage area in the target computer;

e) generating a request for execution when the execution dependency is encountered as the executable code is running in the target computer;

f) evaluating the request for execution to identify which of the plurality of independent processes is required to execute the request for execution;

g) delivering the request for execution via the storage area to the identified independent process;

h) processing the request for execution using the identified independent process to thereby execute the request; and i) returning results of the executed request back to the virtual management interface of the virtual control mechanism such that the application software program is executed despite the execution dependency that is incompatible with the target computer software execution environment.

2. The method as described in claim 1 wherein the application software program is written to execute in a CICS execution environment of the target computer is UNIX-based.

3. The method as described in claim 1 further including the steps of:

assigning, by a second program means of the virtual software machine, each independent process a unique address in the storage area prior to running the executable code in the target computer.

4. A method, using a virtual software machine, for providing a virtual execution environment in a UNIX-based target computer for an application software program written to execute in a CICS execution environment, the application software program having one or more CICS execution dependencies that are incompatible with a UNIX operating system execution environment on the target computer, the virtual software machine comprising a plurality of autonomous and independent processes, pre-processing means, first and second program means, and a virtual control mechanism having a virtual management interface (VMI) for generating requests for execution to the plurality of independent processes and receiving results of such processing, comprising the steps of:

a) identifying, by the pre-processing means, at least one CICS execution dependency of the application software program and in response thereto using the pre-processing means to generate a pre-processed application software program which isolates the identified CICS execution dependency from the application software program;

b) converting, by a compiler means of the target computer, the pre-processed application software program and the virtual control mechanism into object codes;

c) integrating, by a link/edit means of the target computer, the object codes of the pre-processed application software program and the virtual control mechanism to create executable code wherein the virtual control mechanism is substituted for the identified CICS execution dependency of the application software program;

d) generating, by the first program means, a partitioned storage area in the target computer; and e) assigning, by the second program means, each independent process a unique address n the partitioned storage area;

f) generating a request for execution when the CICS execution dependency is encountered as the executable code is running in the target computer;

g) evaluating the request for execution to identify which of the plurality of independent processes is required to execute the request for execution;

h) delivering the request for execution to the unique address in the partitioned storage area for the identified independent process;

i) processing the request for execution using the identified independent process to thereby execute the request; and j) returning results of the executed request back to the virtual management interface of the virtual control mechanism such that the application software program is executed despite the CICS execution dependency that is incompatible with the UNIX-based target computer software execution environment.

* * * * *

UNITED STATES PATENT AND TRADEMARK OFFICE
CERTIFICATE OF CORRECTION

PATENT NO. : 4,961,133
DATED : October 2, 1990
INVENTOR(S) : Talati, et al.

It is certified that error appears in the above-identified patent and that said Letters Patent is hereby corrected as shown below:

In Column 72, line 68, change "of" to -- or --.

In Column 73, line 20, after "integrating" insert -- , --.

In Column 73, line 22, after "control" insert -- mechanism to create executable code wherein the virtual control --.

In Column 73, line 48, after "environment" insert -- and the software execution environment --.

Signed and Sealed this

Twenty-first Day of December, 1993

Attest:

BRUCE LEHMAN

Attesting Officer

Commissioner of Patents and Trademarks